(12) United States Patent
Hirota

(10) Patent No.: US 9,419,738 B2
(45) Date of Patent: Aug. 16, 2016

(54) COMMUNICATION DEVICE, METHOD AND SYSTEM FOR QUEUEING PACKETS TO BE TRANSMITTED

(71) Applicant: FUJITSU LIMITED, Kawasaki-shi, Kanagawa (JP)

(72) Inventor: Masaki Hirota, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 460 days.

(21) Appl. No.: 13/922,541

(22) Filed: Jun. 20, 2013

(65) Prior Publication Data

US 2014/0064297 A1 Mar. 6, 2014

(30) Foreign Application Priority Data

Aug. 31, 2012 (JP) ................................ 2012-191276

(51) Int. Cl.
*H04J 3/06* (2006.01)
*H04L 12/841* (2013.01)
*H04L 12/823* (2013.01)
*H04L 12/863* (2013.01)

(52) U.S. Cl.
CPC ............. *H04J 3/0635* (2013.01); *H04J 3/0667* (2013.01); *H04L 47/283* (2013.01); *H04J 3/0673* (2013.01); *H04L 47/32* (2013.01); *H04L 47/6215* (2013.01)

(58) Field of Classification Search
None
See application file for complete search history.

(56) References Cited

U.S. PATENT DOCUMENTS 6,967,963 B1 * 11/2005 Houh .................. H04L 12/5693
370/428

2004/0114516 A1 6/2004 Iwata et al.
2004/0114607 A1 * 6/2004 Shay ...................... H04L 65/80
370/395.42
2006/0268692 A1 * 11/2006 Wright .................... H04L 47/10
370/229

FOREIGN PATENT DOCUMENTS

| JP | 2002-16637 | | 1/2002 |
|---|---|---|---|
| JP | 2003-152789 | A | 5/2003 |
| JP | 2003-216595 | | 7/2003 |
| JP | 2006-67038 | A | 3/2006 |

OTHER PUBLICATIONS

Japanese Office Action dated Feb. 2, 2016 in corresponding Japanese Patent Application No. 2012-191276 (4 pages) (1 page English Translation).

* cited by examiner

*Primary Examiner* — Ian N Moore
*Assistant Examiner* — Brian T Le
(74) *Attorney, Agent, or Firm* — Staas & Halsey LLP

(57) ABSTRACT

A communication device includes: first and second memories configured to store first and second packets in first and second queues, respectively; a processor configured to: select a packet to be transmitted by selecting the first packet in priority to the second packet, read the selected packet from the first or second queue, and detect the first packet stored in the first queue during reading of the second packet from the second queue; and a third memory configured to hold copied data relating to the second packet, wherein when detecting the first packet, the processor is configured to cause an internal or external part of the communication device to discard the currently read second packet, read the first packet stored in the first queue, and read the copied data from the third memory after completion of the reading of the first packet.

17 Claims, 23 Drawing Sheets

FIG. 3

| BITS | | | | | | | | OCTETS |
|---|---|---|---|---|---|---|---|---|
| 7 | 6 | 5 | 4 | 3 | 2 | 1 | 0 | |
| TransportSpecfic | | | | messageType | | | | 1 |
| reserved | | | | versionPTP | | | | 1 |
| messageLength | | | | | | | | 2 |
| domainNumber | | | | | | | | 1 |
| reserved | | | | | | | | 1 |
| flagField | | | | | | | | 8 |
| correctionField | | | | | | | | 4 |
| reserved | | | | | | | | 2 |
| sourcePortId | | | | | | | | 10 |
| sequenceId | | | | | | | | 2 |
| controlField | | | | | | | | 1 |
| logMessageInterval | | | | | | | | 1 |
| Origin Time Stamp (FOR Sync AND Delay_Req) | | | | | | | | 10 |

PTP HEADER: rows from TransportSpecfic/messageType through logMessageInterval

MESSAGE FIELD: Origin Time Stamp (FOR Sync AND Delay_Req)

FIG. 4

| MESSAGE TYPE | VALUE (hex) |
|---|---|
| Sync | 0 |
| Delay_Req | 1 |
| Pdelay_Req | 2 |
| Pdelay_Resp | 3 |
| Reserved | 4-7 |
| Follow_Up | 8 |
| Delay_Resp | 9 |
| Pdelay_Resp_Follow_Up | A |
| Announce | B |
| Signaling | C |
| Management | D |
| Reserved | E-F |

FIG. 11

| BITS | | | | | | | | OCTETS |
|---|---|---|---|---|---|---|---|---|
| 7 | 6 | 5 | 4 | 3 | 2 | 1 | 0 | |
| DA | | | | | | | | 6 |
| SA | | | | | | | | 6 |
| TYPE | | | | | | | | 2 |
| SYNCHRONIZATION MESSAGE | | | | | | | | 44 |
| FCS | | | | | | | | 4 |

MAC HEADER (14BYTES): DA, SA, TYPE

SYNCHRONIZATION MESSAGE (44BYTES)

FCS (4BYTES)

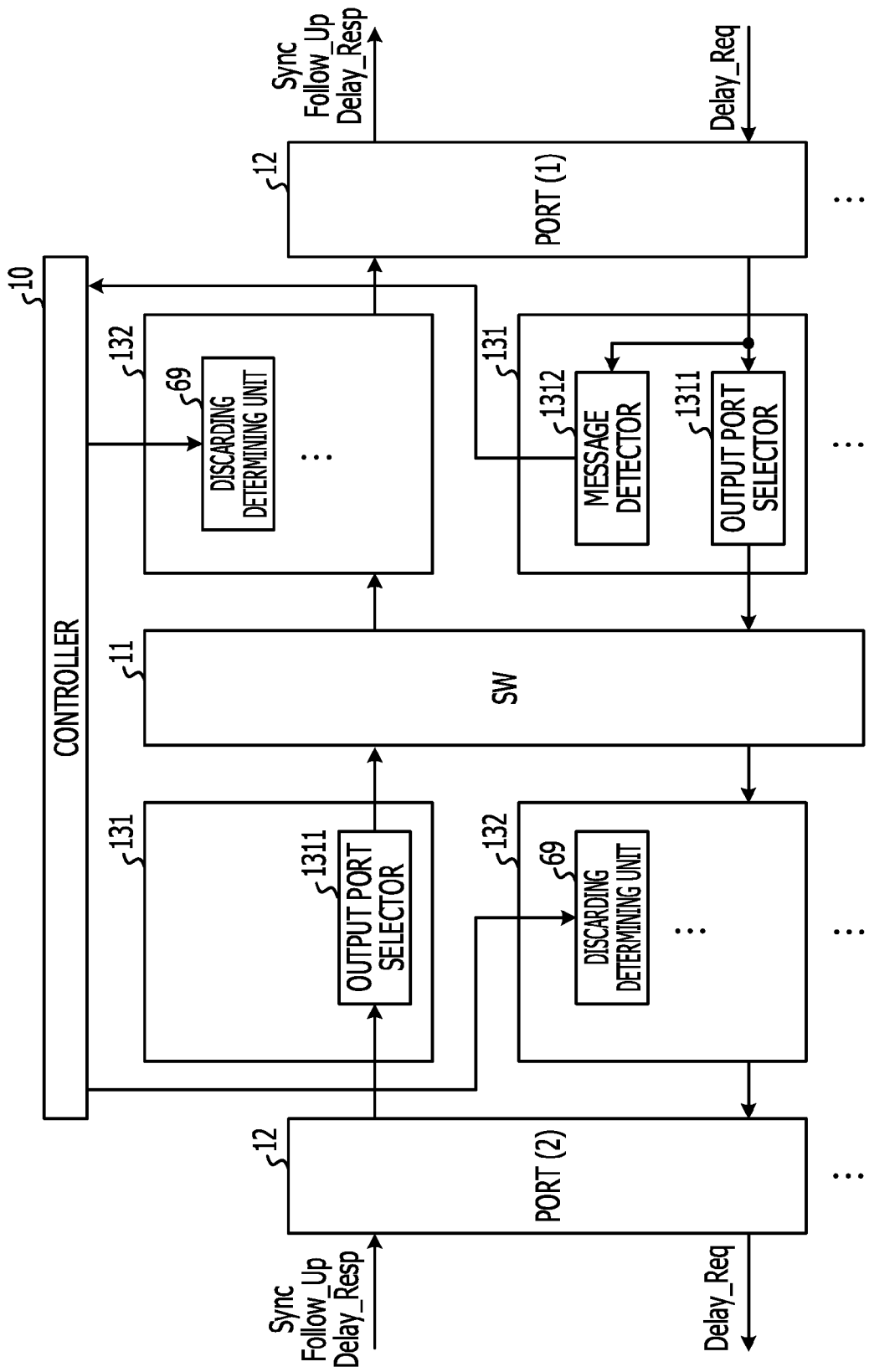

COMMUNICATION DEVICE, METHOD AND SYSTEM FOR QUEUEING PACKETS TO BE TRANSMITTED

CROSS-REFERENCE TO RELATED APPLICATION

This application is based upon and claims the benefit of priority of the prior Japanese Patent Application No. 2012-191276, filed on Aug. 31, 2012, the entire contents of which are incorporated herein by reference.

FIELD

The embodiments discussed herein are related to a communication device, a communication method, and a communication system.

BACKGROUND

In a time division multiplexing (TDM) network, a plurality of transmitting devices execute time synchronization and frequency synchronization by producing clocks from data signals that are continuously transmitted. Examples of a standard for a synchronous transmission method to be used for TDM are synchronous digital hierarchy (SDH) and synchronous optical network (SONET).

With the wide use of the Internet, networks that support Internet Protocol (IP) are widely used. According to IP, data signals are asynchronously transmitted on a packet basis unlike TDM, and time synchronization and frequency synchronization are executed by different methods.

Examples of a standard for the time synchronization and the frequency synchronization that are based on IP are Network Time Protocol (NTP) and IEEE 1588-2008 (IEEE: The Institute of Electrical and Electronics Engineers, Inc.). A technique that is defined by IEEE 1588-2008 enables time synchronization with accuracy of microseconds and is expected to be applied to a synchronization process that is executed between base stations in a wireless network.

Examples of the related art may include Japanese Laid-open Patent Publication No. 2002-16637, and Japanese Laid-open Patent Publication No. 2003-216595.

SUMMARY

According to an aspect of the invention, a communication device includes: first and second memories configured to store first and second packets in first and second queues, respectively; a processor configured to: select a packet to be transmitted by selecting the first packet in priority to the second packet, read the selected packet from the first or second queue, and detect the first packet stored in the first queue during reading of the second packet from the second queue; and a third memory configured to hold copied data relating to the second packet, wherein when detecting the first packet, the processor is configured to cause an internal or external part of the communication device to discard the currently read second packet, read the first packet stored in the first queue, and read the copied data from the third memory after completion of the reading of the first packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of the configuration of a synchronization message used in the sequence illustrated in FIG. 2;

FIG. 4 is a diagram illustrating an example of a list of types of synchronization messages;

FIG. 11 is a diagram illustrating an example of the configuration of a layer 2 packet that includes a synchronization message;

FIG. 23 is a diagram illustrating the configuration of the communication device according to the fifth embodiment.

DESCRIPTION OF EMBODIMENTS

Figure 1:
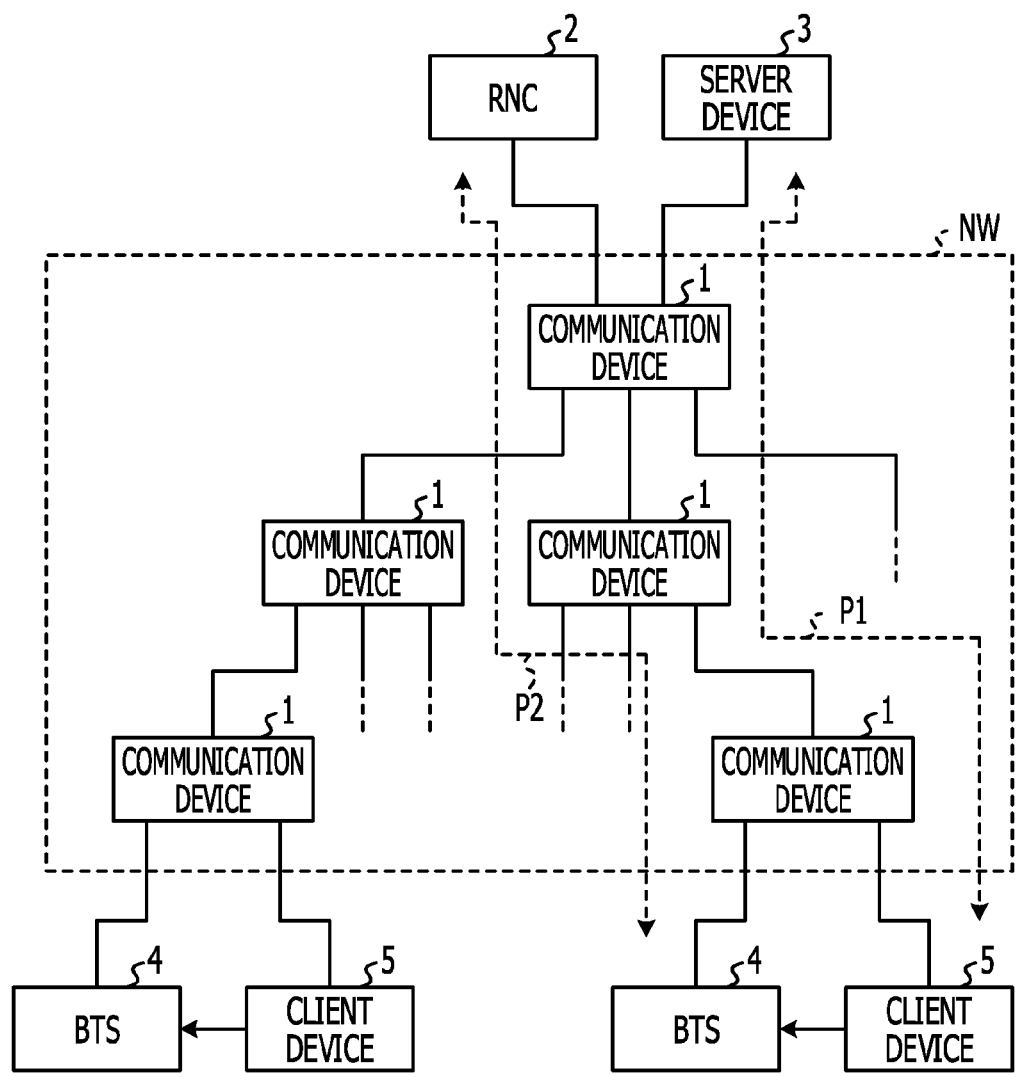
FIG. 1 is a configuration diagram illustrating an example of a network that includes a plurality of communication devices that relay a synchronization message.

Hereinafter, the embodiments disclosed herein are described with reference to the accompanying drawings.

While inventing the present embodiments, observations were made regarding a related art. Such observations include the following, for example.

In a communication system of the related art, when IP is used, a synchronization process is executed by exchanging synchronization messages including timestamps (time information) between a server device and a plurality of client devices, measuring transmission delay times of the server device and client devices, and estimating offset amounts of a frequency and time. The synchronization messages are exchanged through one or more relay devices that are arranged in the network and are L2 switches, routers, or the like.

The relay devices relay not only the synchronization messages but also packets of other traffic. In a transfer process executed by the relay devices, a synchronization message may compete with another packet to be transmitted from the same port. If the competition occurs, the synchronization message is selected as a message to be transmitted on a priority basis, and a process (of reading the other packet from a queue) of transmitting the competing other packet is already started, the synchronization message stands by until the transmission process is completed.

Thus, a transmission delay time of the synchronization message in the network may be varied by the other traffic. The variation in the transmission delay time is referred to as a packet delay variation (PDV) or the like and may cause a reduction in the accuracy of the time synchronization and frequency synchronization.

Regarding the PDV, one aspect of the related art discloses a technique for causing a packet scheduling device to divide a low-priority packet and thereby maintain time intervals between transmission of a premium packet when transmission of the low-priority packet affects the transmission of the premium packet. In addition, another aspect of the related art discloses a multi-processor system that causes a synchronization message to be transmitted from a synchronization message transmitting device to a plurality of CPU boards for clock synchronization. In the multi-processor system, the synchronization message transmitting device is connected to the CPU boards in order to reduce a skew of the synchronization message, while the number of switches arranged between the synchronization message transmitting device and CPU boards is equal to the number of the CPU boards.

According to the technique of the one aspect of the related art, a transmitting device has to have a function (fragmentation and the like) of dividing a packet, and a receiving device also has to have a function of combining divided packets into a single packet. Thus, the devices are desired to have high processing abilities, and thus, the devices come to have complicated configurations, so that the cost is high. In addition, since header information including destinations has to be added to every divided packet, an increase in data amount by the addition of the header information may reduce an available communication band.

According to the technique of the other aspect of the related art, since the number of installable switches in the network is limited, the network may not be flexibly designed. These problems occur to not only communication to be executed for time synchronization and frequency synchronization but also communication for which a low variation in delay times is requested, for example, communication for a video distribution service.

An object of the embodiments disclosed herein, therefore, is to provide a communication device, a communication method, and a communication system, which efficiently reduce a variation in delay times of packets that are transmitted.

FIG. 1 illustrates an example of a network that includes a plurality of relay devices that relay a synchronization message. The network is a wireless network to be used for communication between wireless communication terminals such as smart phones and mobile phones.

A relay network NW includes a plurality of communication devices 1 and relays communication between a radio network controller (RNC) 2 and a plurality of base transceiver stations (BTSs) 4. The radio network controller 2 controls the plurality of base transceiver stations 4 and thereby controls connections established and to be established by generating and receiving calls, call termination, and handover.

The communication device 1 is a relay device that relaies a packet received from a certain device to another device in accordance with a destination of the packet. For example, the communication device 1 is a router (layer 3 switch), layer 2 switch, or the like. In the present specification, the term "packets" indicates transmission units of data (information) to be transmitted. Thus, the packets include IP packets and other protocol data units (PDUs) such as Ethernet (registered trademark, the same applies hereinafter) frames and asynchronous transfer mode (ATM) cells.

In addition, the relay network NW relays communication between a server device 3 and a plurality of client devices 5. Thus, communication (refer to dashed line P1) between the server device 3 and the client devices 5 and communication (refer to dashed line P2) between the radio network controller 2 and the base transceiver stations 4 are executed through the common relay network NW.

The server device 3 has a master clock that serves as a standard for operational timing of the devices within the relay network NW. The client devices 5 exchange synchronization messages with the server device 3 and thereby execute at least one of time synchronization and frequency synchronization. The client devices 5 supply a clock synchronized with the master clock or a time synchronized with the master clock to the base transceiver stations 4. The plurality of client devices 5 are synchronized with each other by the supply and the control handover may be executed with high accuracy as described above.

Figure 2:
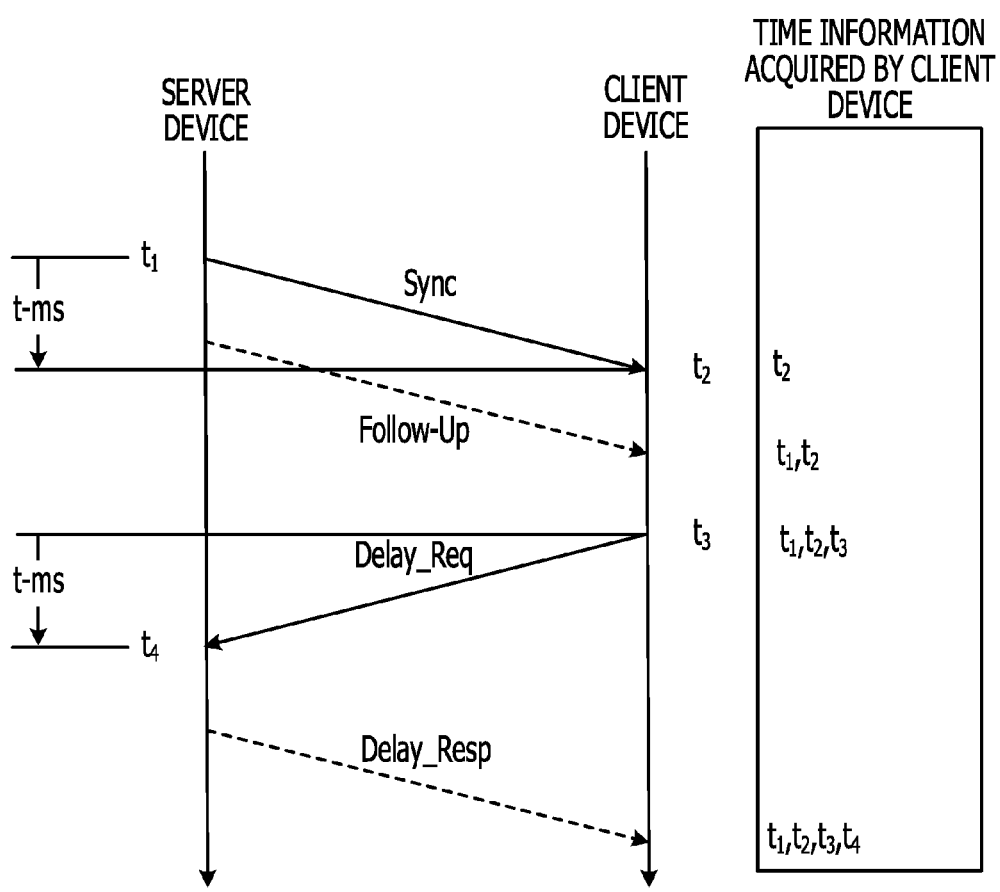
FIG. 2 is a ladder chart illustrating an example of a sequence of transmission and reception of synchronization messages between a server device and a client device.

FIG. 2 illustrates an example of a sequence of transmission and reception of synchronization messages between the server device 3 and a client device 5. Although FIG. 2 illustrates a sequence based on Precision Time Protocol (PTP) defined by IEEE 1588-2008, the sequence is not limited to this and may be replaced with another sequence.

FIG. 3 illustrates an example of the configuration of a synchronization message used in the sequence illustrated in FIG. 2. The synchronization message includes a PTP header and a message field. The PTP header stores "messageType" information that indicates the type of the synchronization message. The content of the "messageType" information is based on a list illustrated in FIG. 4. For example, if the "messageType" information indicates a value of "0", the synchronization message is "Sync".

In the sequence of this example, four types of synchronization messages "Sync", "Follow-Up", "Delay_Req", and "Delay-Resp" are used. The client device 5 exchanges the synchronization messages with the server device 3 and thereby acquires time information t1 to t4 that are referred to as timestamps or the like. The time information t1 to t4 are stored in the message fields illustrated in FIG. 3 (refer to "OriginTimeStamp" information). The time information t1 to t4 acquired by the client device 5 is illustrated on the right side of the sheet of FIG. 2 in a stepwise manner.

First, the server device 3 transmits "Sync" including the time information t1 to the client device 5, while the time information t1 indicates an estimated value of a transmission time of "Sync". Then, the client device 5 receives "Sync" and acquires the time information t2 that indicates a reception time of "Sync". The server device 3 transmits, to the client device 5, "Follow_Up" that includes the time information t1 of which an error of the estimated value has been corrected. Then, the client device 5 acquires the transmission time t1 and the reception time t2.

Next, the client device 5 transmits, to the server device 3, "Delay_Req" that includes the time information t3 indicating a transmission time of "Delay_Req". The server device 3 receives "Delay_Req" and transmits, to the client device 5, "Delay_Resp" that includes the time information t4 indicating a reception time of "Delay_Req". Thus, the client device 5 acquires the transmission time t3 and the reception time t4.

The client device 5 calculates a value of (t2−t1) and may thereby obtain a transmission delay time (t−ms) in a transmission direction from the server device 3 to the client device 5. In addition, the client device 5 calculates a value of (t4−t3) and may thereby obtain a transmission delay time (t−sm) in a transmission direction from the client device 5 to the server device 3. If the transmission delay times in the transmission directions are equal, a time value to be offset between the server device 3 and the client device 5 is obtained by calculating a formula of ((t−ms)+(t−sm))/2.

Figure 5:
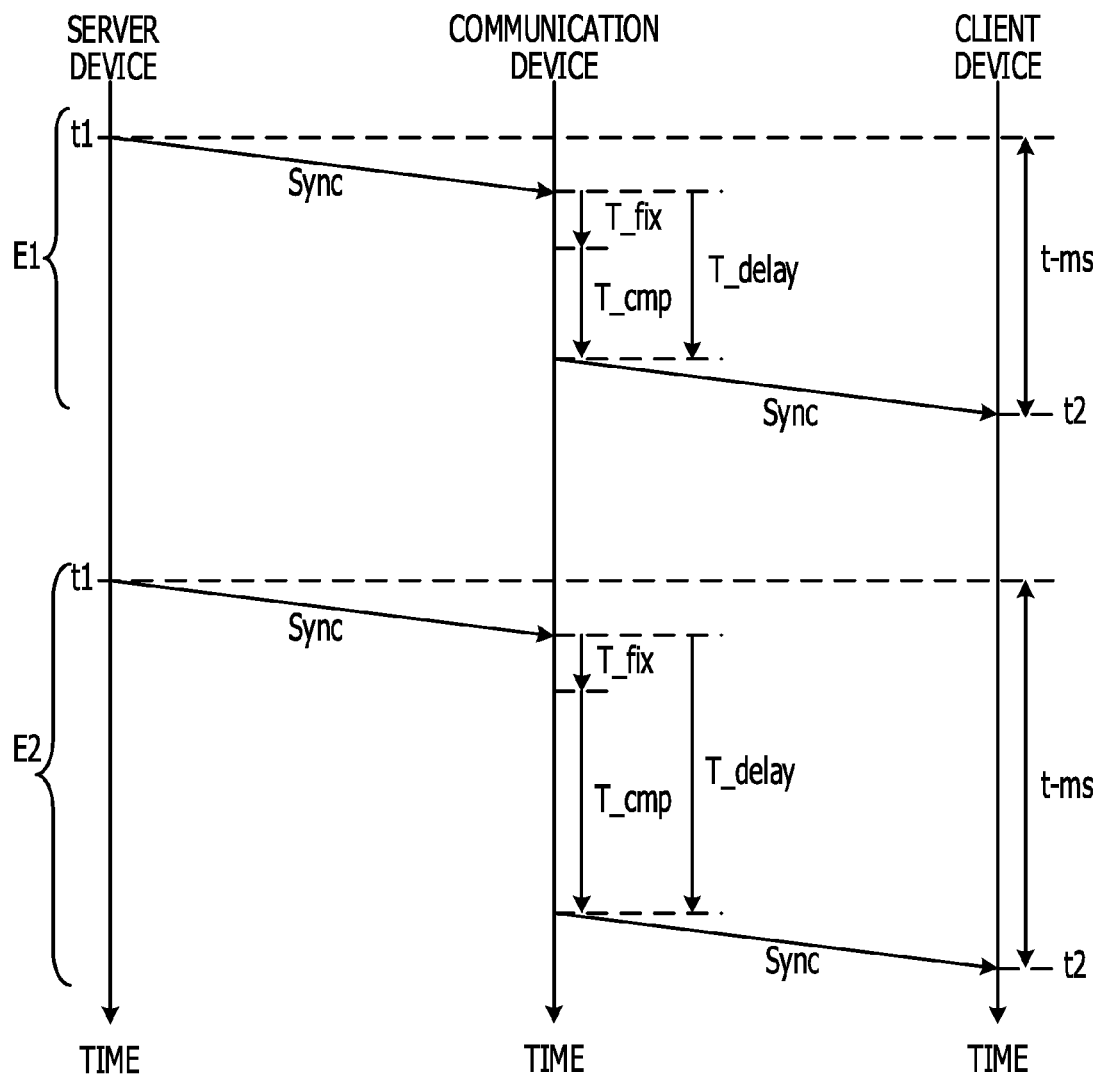
FIG. 5 is a ladder chart illustrating delay times caused by a communication device.

The transmission delay times (t−ms) and (t−sm) each include a delay time caused by a communication device 1. FIG. 5 illustrates a delay time T_delay caused by the communication device 1 when "Sync" is transmitted as an example. Although FIG. 5 illustrates the case where "Sync" is transmitted through the single communication device 1, the same applies the case where "Sync" is transmitted through a plurality of communication devices 1 in the following description.

The delay time T_delay caused by the communication device 1 includes a fixed delay time T_fix consistently caused by a predetermined internal process and a competition delay time T_cmp caused by competition between a process of transferring "Sync" and a process of transferring another packet. Regarding the competition delay time, since the communication device 1 relays, as described above, not only a packet (synchronization message) transmitted and received between the server device 3 and the client devices 5 but also another packet transmitted and received between the radio network controller 2 and the base transceiver stations 4, a packet including a synchronization message may compete with another packet to be transmitted from the same port and may wait to be transmitted. In this case, the competition delay time T_cmp occurs.

The competition delay time T_cmp varies depending on the state of the traffic of other packets transmitted in the network. For example, a competition delay time T_cmp indicated by symbol E2 is longer than that indicated by symbol E1, and whereby a transmission delay time (t−ms) of the example indicated by symbol E2 is longer than a transmission delay time (t−ms) of the example indicated by symbol E1.

Figure 6:
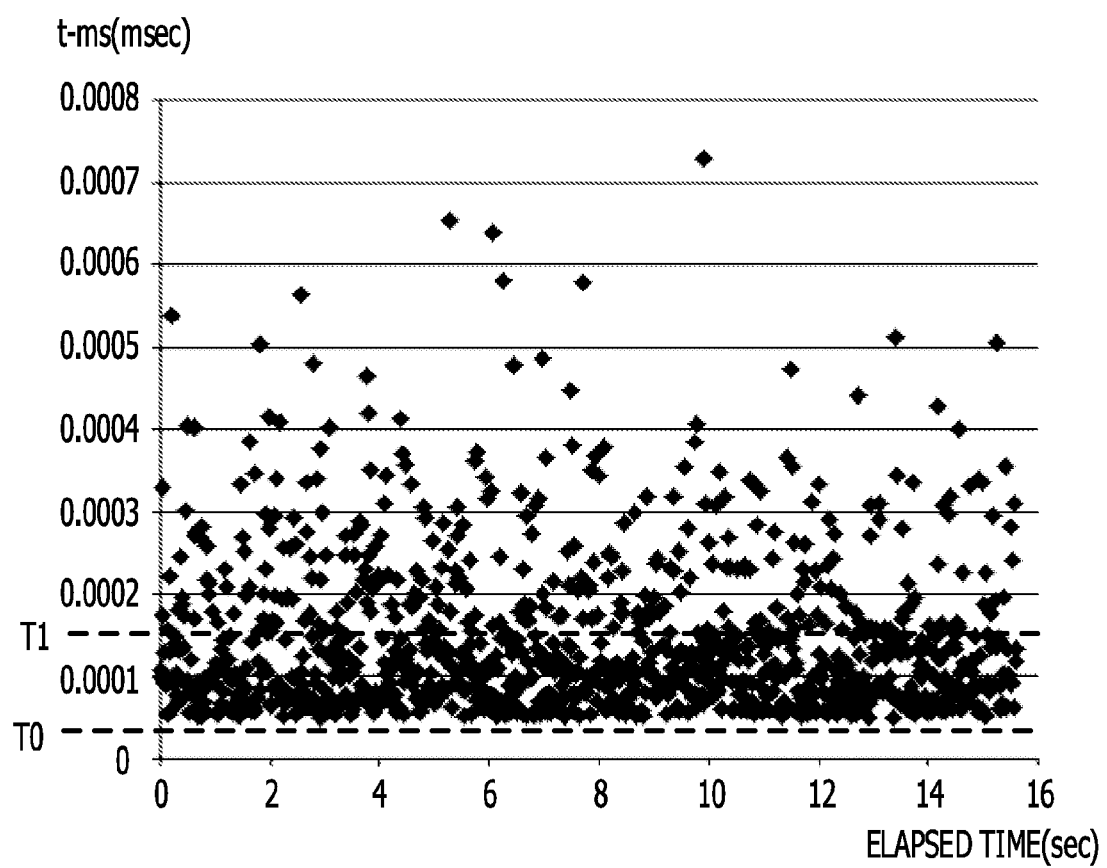
FIG. 6 is a graph illustrating an example of a distribution of transmission delay times if the traffic of competing other packets is low.
Figure 7:
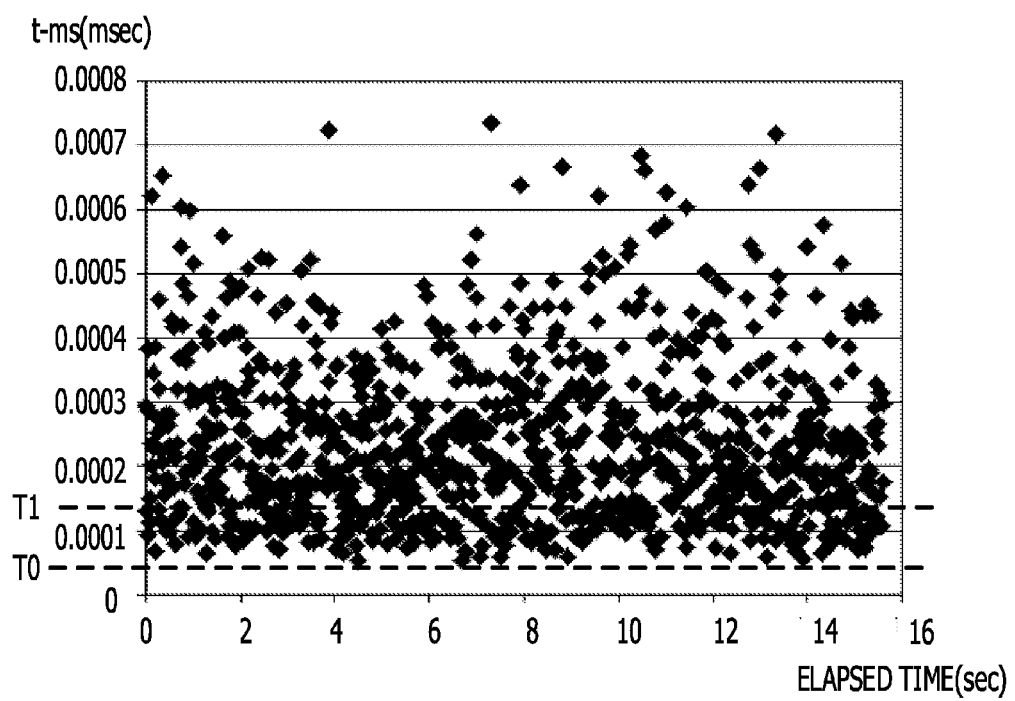
FIG. 7 is a graph illustrating an example of a distribution of transmission delay times if the traffic of competing other packets is high.

FIGS. 6 and 7 are graphs illustrating simulation results of distribution of transmission delay times (t−ms) when the competition with other traffic is low and high, respectively. In the graphs, the abscissa indicates an elapsed time, and the ordinate indicates a transmission delay time (t−ms). Filled dot in a range between dashed lines T0 and T1 may indicate transmission delay time without competition delay time T_cmp. Hereinafter, the range is represented by a "minimum transmission delay time range".

As is understood by comparison of the graphs of FIGS. 6 and 7, the higher a level of the competition with other traffics, the larger a variation (dispersion level) in transmission delay times (t−ms). This is due to the fact that there is a higher tendency that the larger the traffic of competing other packets, the higher the probability of the occurrence of competition and the longer the competition delay time T_cmp.

A variation in transmission delay times (t−ms) affects the accuracy of the synchronization of the client devices 5 as a variation in delays of packets. Thus, in order to improve the accuracy of the synchronization, the number of packets of which transmission delay times (t−ms) is in the minimum transmission delay time range is preferably large. For example, it is preferable that transmission delay times (t−ms) of approximately 1% of packets in a predetermined unit time be in the minimum transmission delay time range. Although the transmission delay times (t−ms) of the packets transmitted in one transmission direction are described above as an example, a variation in transmission delay times (t−sm) of packets transmitted in the other transmission direction occurs.

Figure 8:
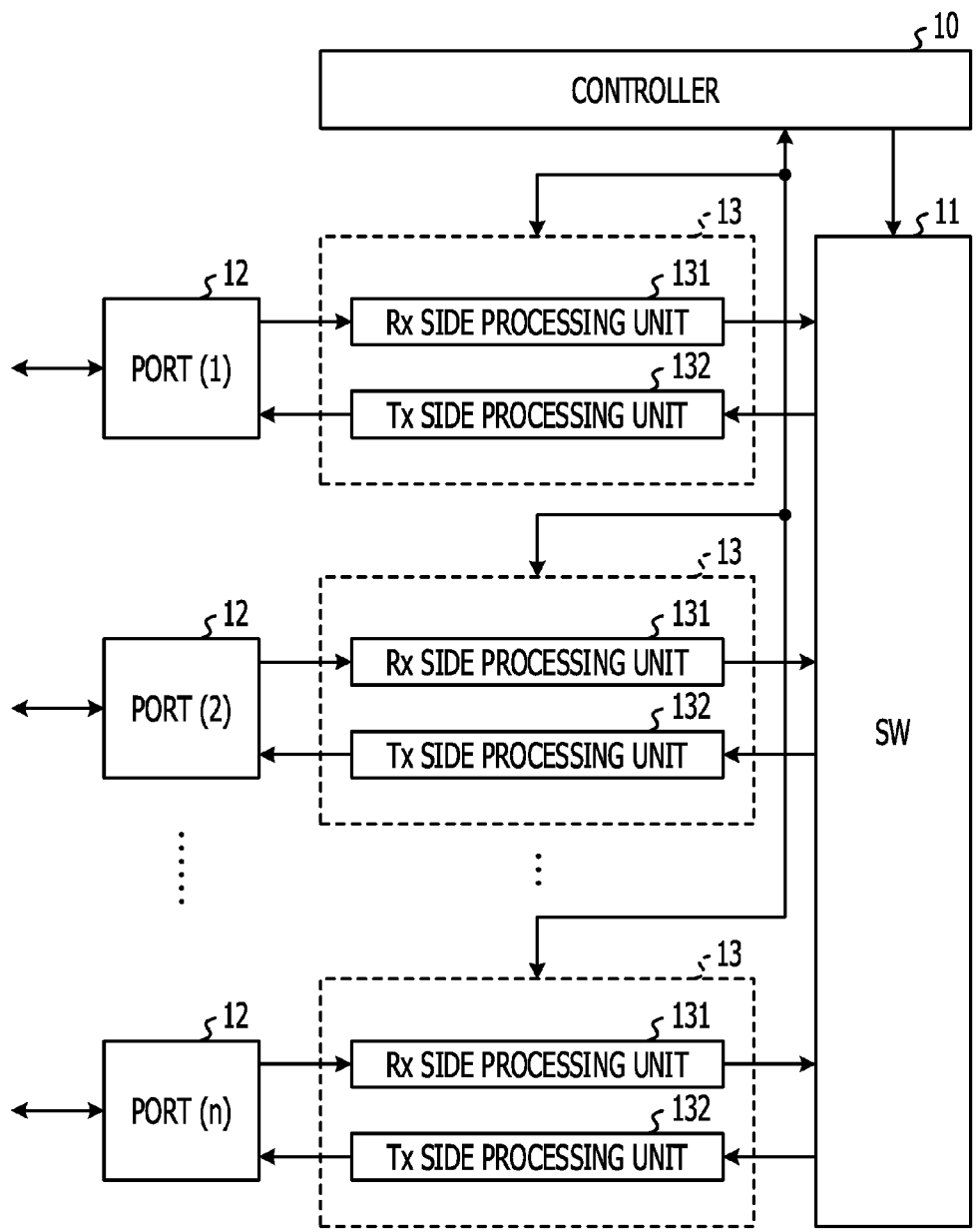
FIG. 8 is a diagram illustrating an example of the functional configuration of a communication device according to a comparative example.

Next, a mechanism that causes competition is described. FIG. 8 illustrates an example of a functional configuration of a communication device 1 according to a comparative example. The communication device 1 includes a controller 10, a switch 11, a plurality of ports (1)12 to (n)12, and a plurality of transmission processing units 13. The transmission processing units 13 are provided for the ports (1)12 to (n)12, respectively, and each include an Rx-side processing unit 131 and a Tx-side processing unit 132.

The ports (1)12 to (n)12 are connected to external devices through local area network (LAN) cables. Packets are transmitted and received between the ports (1)12 to (n)12 and the external devices. The Rx-side processing units 131 process packets received through the ports (1)12 to (n)12. For example, the Rx-side processing units 131 identify the destination ports (1)12 to (n)12 on the basis of destination information included in the packets and output the packets and data on destination port number to the switch 11.

The switch 11 outputs, on the basis of the destination port numbers, the packets to the Tx-side processing units 132 corresponding to the destination ports (1)12 to (n)12. The Tx-side processing units 132 process the packets to be transmitted through the ports (1)12 to (n)12 and sequentially output, to the ports (1)12 and (n)12, the packets to be transmitted.

The controller 10 is an arithmetic processing unit such as a central processing unit (CPU) and controls the overall communication device 1. The controller 10 executes a process of setting the transmission processing units 13 and the switch 11 on the basis of an operation of an external terminal device such as a computer and reads information from the transmission processing units 13 and the switch 11.

Figure 9:
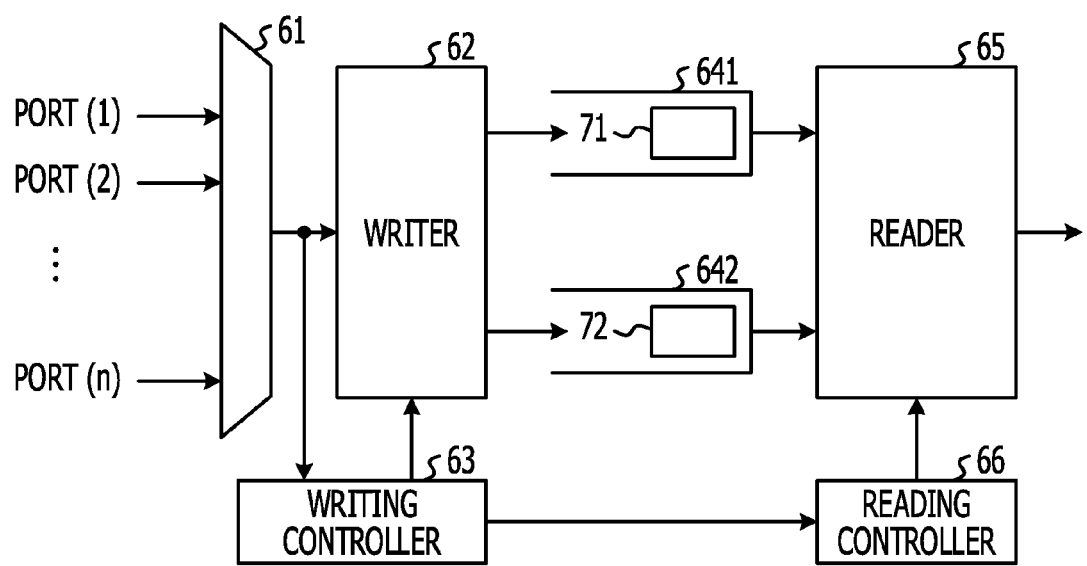
FIG. 9 is a diagram illustrating a functional configuration of a Tx-side processing unit of the communication device according to the comparative example.

FIG. 9 is a diagram illustrating a functional configuration of the Tx-side processing unit 132 of the communication device 1 according to the comparative example. The Tx-side processing unit 132 includes a MUX unit 61, a writer 62, a writing controller 63, a priority queue 641, a non-priority queue 642, a reader 65, and a reading controller 66.

The MUX unit 61 sequentially outputs, to the writer 62, packets received from the ports (1)12 to (n)12 through the switch 11. The writer 62 writes each of the packets in the priority queue 641 or the non-priority queue 642 in accordance with a notification provided by the writing controller 63. The writing controller 63 monitors the packets output from the MUX unit 61 toward the writer 62 and determines whether each of the packets is written in the priority queue 641 or the non-priority queue 642. The writing controller 63 notifies the writer 62 and the reading controller 66 of the queue 641 or 642 determined as a queue in which a packet is to be written.

The priority queue 641 is a buffer that stores a priority packet 71 received through a port 12, while the non-priority queue 642 is a buffer that stores a non-priority packet 72 received through a port 12. The priority queue 641 and the non-priority queue 642 are each composed of a storage unit such as a memory. The priority packet 71 is a packet that is transmitted on a priority basis over the non-priority packet 72 and includes any of the aforementioned synchronization messages. The non-priority packet 72 is a packet that is transmitted and received between the radio network controller 2 and the base transceiver stations 4. The priority packet 71 may include a packet other than the packet that includes the synchronization message.

Figure 10:
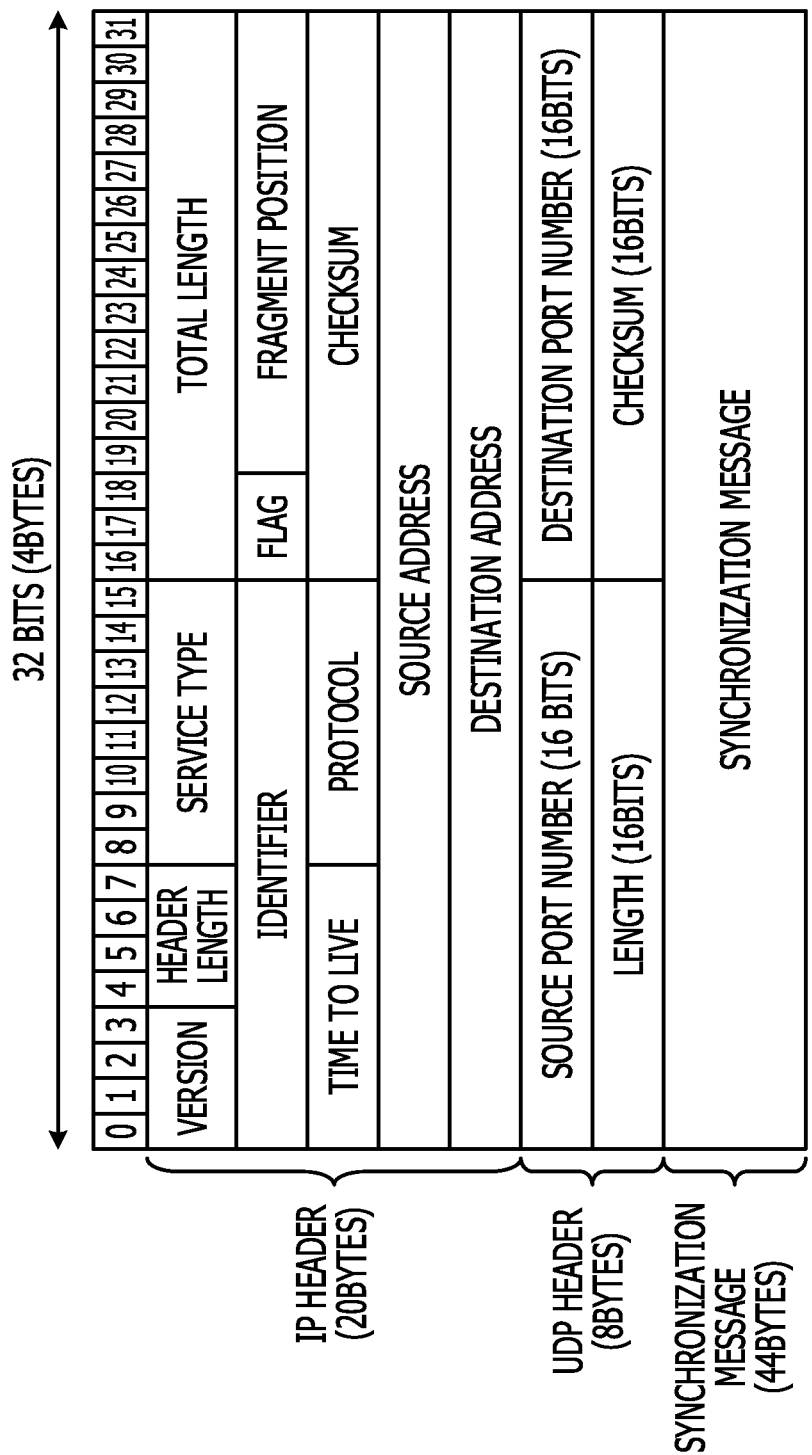
FIG. 10 is a diagram illustrating an example of the configuration of a layer 3 packet that includes a synchronization message.

FIG. 10 illustrates an example of the configuration of a layer 3 packet that includes a synchronization message. The packet 71 includes an Internet Protocol (IP) header, a User Datagram Protocol (UDP) header, and a synchronization message. An example of the configuration of the synchronization message is described with reference to FIG. 3.

The IP header includes information of a version, a header length, a service type, a total length, a time to live (TTL), an identifier, a flag, a fragment position, a protocol, a checksum, a source address, and a destination address. The UDP header includes information of a source port number, a destination port number, a length, and a checksum. For example, the writer 62 may determine a priority of the packet by referencing the service type information included in the IP header. The identifier, the flag, and the fragment position that are included in the IP header are used for a fragment process when the packet is divided into a plurality of packets.

The synchronization messages are not limited to layer 3 packets and may be transferred as layer 2 frames. FIG. 11 illustrates an example of the configuration of a layer 2 frame that includes a synchronization message.

A frame (packet 71) includes a media access control (MAC) header, a synchronization message, and a frame check sequence (FCS). The MAC header includes DA indicating a destination address, SA indicating a source address, and Type indicating a protocol. The FCS is an inspection code that is used to inspect the normality of data included in the frame.

The writer 62 may determine a priority of the packet by referencing the "Type" information included in the MAC header. The frame may have a virtual local area network (VLAN) tag, and the priority may be determined on the basis of priority information included in the VLAN tag. Ethernet frames do not have a field corresponding to the fragment process for the division. Thus, the technique disclosed in Japanese Laid-open Patent Publication No. 2002-16637 is not applied to Ethernet frames.

Referring back to FIG. 9, the reader 65 selects, as a packet to be transmitted, the priority packet 71 on a priority basis over the non-priority packet 72 and reads, from the priority queue 641 or the non-priority queue 642, the selected packet 71 or 72 to be transmitted. The read packet 71 or 72 is transmitted from the ports (1)12 to (n)12 through the switch 11 and the Tx-side processing units 132 to external devices.

The reading controller 66 manages the states of the packets 71 and 72 stored in the queues 641 and 642 on the basis of a notification provided from the writing controller 63. The reading controller 66 instructs the reader 65 to read the packets 71 and 72 (from the queues 641 and 642) on the basis of the states of the stored packets 71 and 72.

Figure 12:
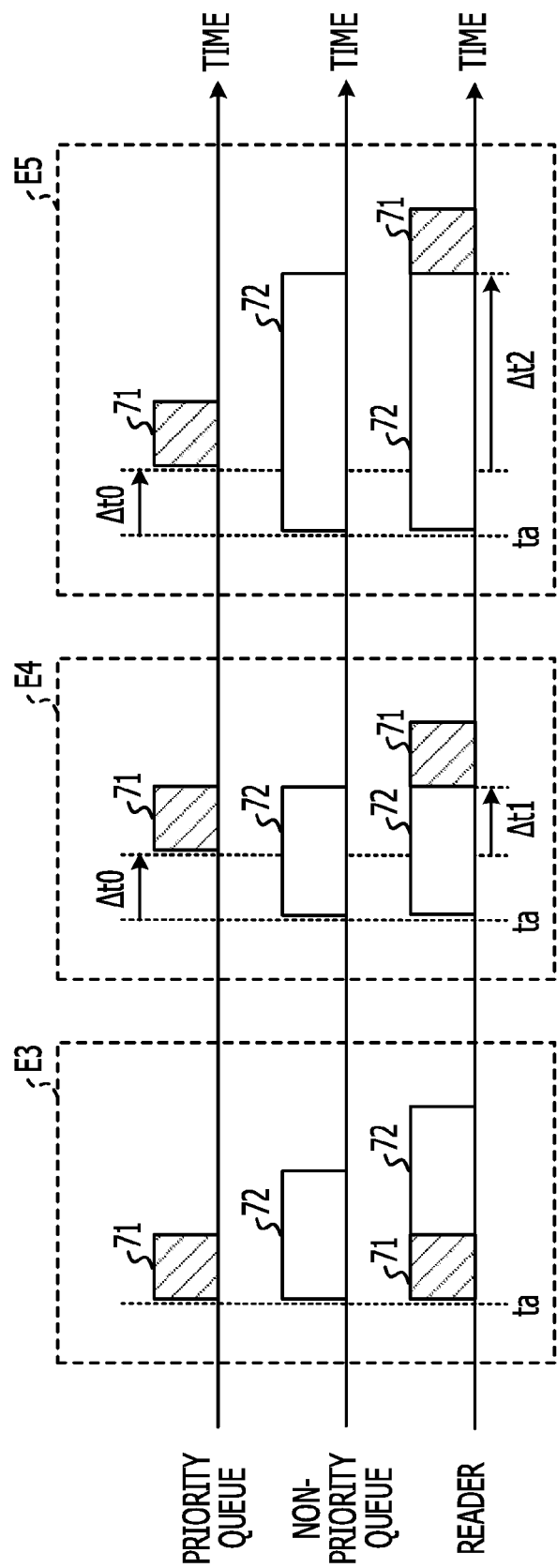
FIG. 12 is a time chart illustrating an example of timing related to transmission of a packet by the communication device according to the comparative example.

FIG. 12 is a time chart illustrating an example of timing related to transmission of the packets 71 and 72 by the communication device 1 according to the comparative example. In FIG. 12, a "priority queue" indicates the timing of storing the priority packet 71 in the priority queue 641, a "non-priority queue" indicates the timing of storing the non-priority packet 72 in the non-priority queue 642, and a "reader" indicates the timing of reading the packets 71 and 72 by the reader 65. The widths of the packets 71 and 72 in the direction of a time axis indicate the lengths of the packets 71 and 72 or the amounts of data of the packets 71 and 72. It is assumed that the non-priority packet 72 is a variable-length packet such as an Ethernet frame.

An example indicated by symbol E3 indicates that the priority packet 71 and the non-priority packet 72 are stored in the priority queue 641 and the non-priority queue 642 at the same time ta, respectively. In this case, the reader 65 reads the priority packet 71 from the priority queue 641 on a priority basis and reads the non-priority packet 72 from the non-priority queue 642 after the reading of the priority packet 71, and the competition delay time T_cmp, therefore, does not occur.

An example indicated by symbol E4 indicates that the non-priority packet 72 is stored in the non-priority packet 642 at the time ta, and the priority packet 71 is stored in the priority queue 641 at a time ta+Δt0 after the time ta. Specifically, this example indicates that the priority packet 71 is stored in the priority queue 641 during reading of the non-priority packet 72 from the non-priority queue 642 by the reader 65. In this case, after reading the first received non-priority packet 72 from the non-priority queue 642, the reader 65 reads the second received priority packet 71 from the priority queue 641. Thus, a competition delay time T_cmp that corresponds to a period of time Δt1 for the priority packet 71 to wait occurs.

In addition, the length of the non-priority packet 72 that is described in an example indicated by symbol E5 is longer than the length of the non-priority packet 72 described in the example indicated by symbol E4. In the example indicated by symbol E5, a period of time Δt2 for the priority packet 71 to wait is longer than the waiting time Δt1 of the example indicated by symbol E4, and the competition delay time T_cmp is longer. The competition delay time T_cmp varies depending on not only the amount of other traffic competing with the priority packet 71 including the synchronization message but also the length of the packet 72 and the timing of the storage.

Figure 13:
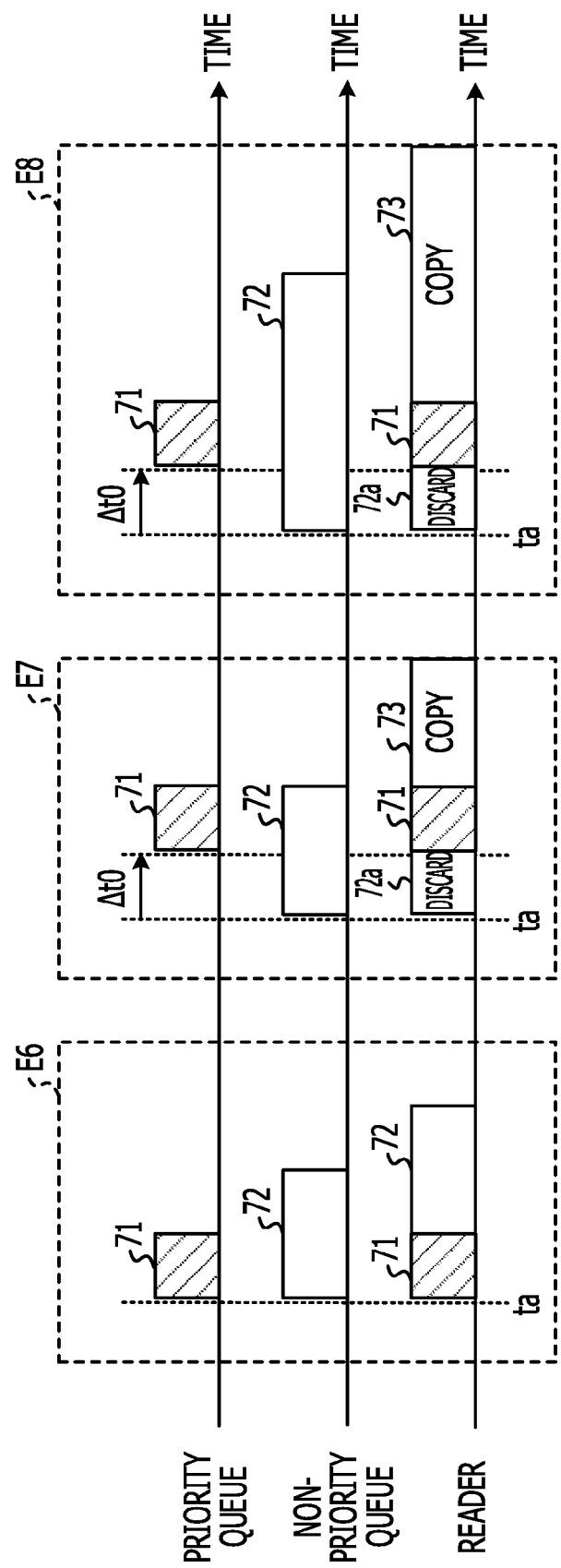
FIG. 13 is a time chart illustrating an example of timing related to transmission of a packet by a communication device according to each of the embodiments.

On the other hand, when the priority packet 71 is stored in the priority queue 641 during reading of the non-priority packet 72 from the non-priority queue 642, the communication device 1 according to the embodiments discards the currently read non-priority packet 72 and reads the priority packet 71. FIG. 13 illustrates an example of timing related to transmission of packets by the communication device 1 according to the embodiments.

Examples indicated by symbols E6 to E8 correspond to the examples indicated by symbols E3 to E5 in FIG. 12. In the example indicated by symbol E6, the reader 65 reads the priority packet 71 from the priority queue 641 on a priority basis and reads the non-priority packet 72 from the priority queue 642 after the reading of the priority packet 71 in the same manner as the comparative example.

In the examples indicated by symbols E7 and E8, the reader 65 discards the currently read non-priority packet 72 and reads the priority packet 71, unlike the comparative example. Specifically, the reader 65 discards read data 72a of the non-priority packet 72 and reads the priority packet 71. Since the priority packet 71 is read without waiting regardless of the fact that the priority packet 71 is stored in the priority queue 641 after the non-priority packet 72, the competition delay time T_cmp does not occur. Thus, the delay T_delay caused by the communication device 1 includes only the fixed delay T_fix (refer to FIG. 5) and therefore is a fixed value.

After completion of the reading of the priority packet 71, the reader 65 reads a packet 73 obtained by copying the non-priority packet 72. The copied packet 73 may be copied data of the overall non-priority packet 72 or data obtained by adding unread data remaining in the non-priority queue 642 to data obtained by copying the read data 72*a* of the non-priority packet 72. Thus, a variation in delays of the priority packets 71 is reduced without a loss of the non-priority packets 72.

Next, details of the communication device 1 according to the embodiments are described.

First Embodiment

Figure 14:
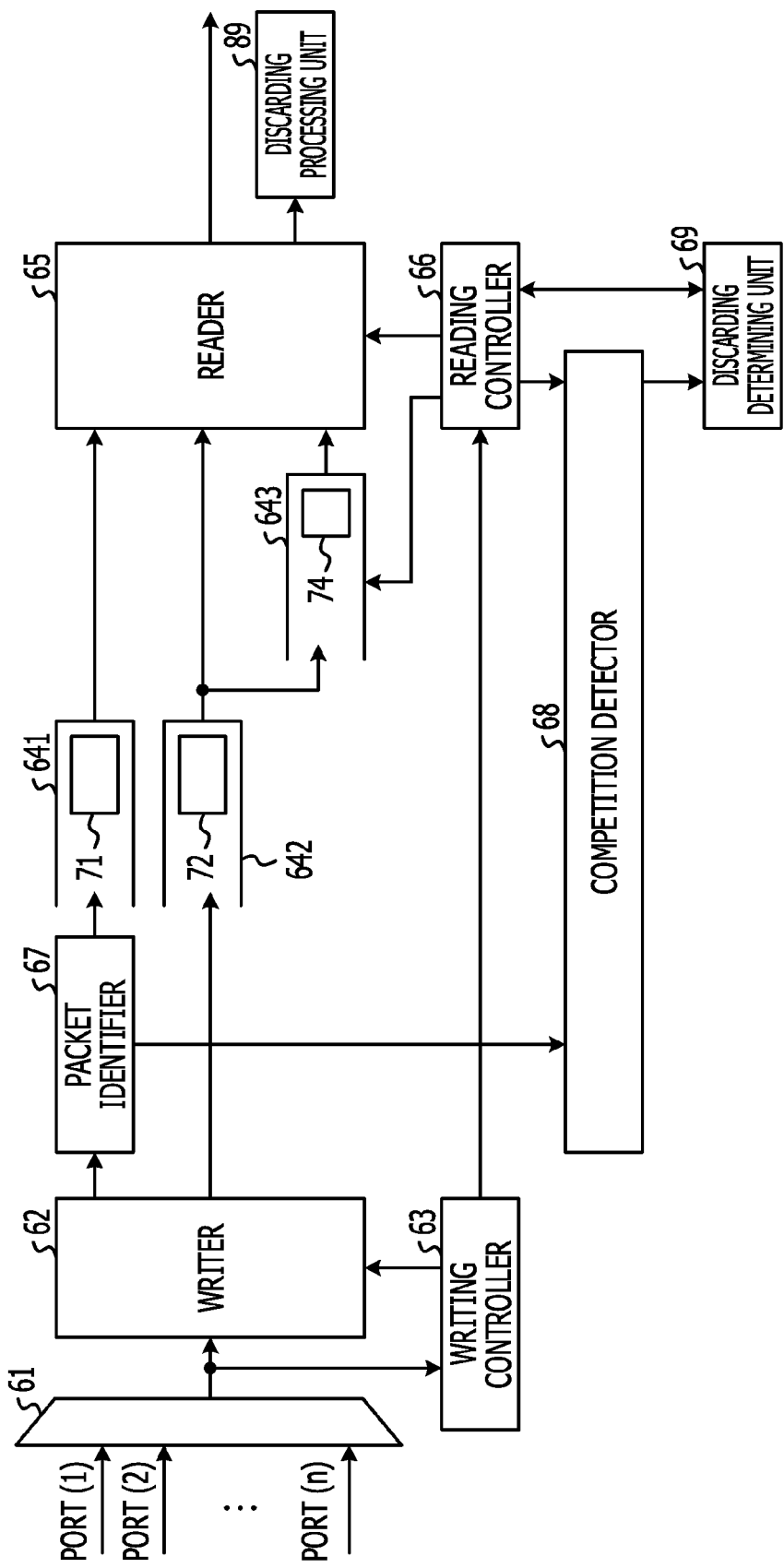
FIG. 14 is a diagram illustrating the configuration of the communication device according to the first embodiment.

FIG. 14 illustrates the configuration of the communication device 1 according to the first embodiment. Specifically, FIG. 14 illustrates the configuration of the Tx-side processing unit 132 illustrated in FIG. 8, and the overall configuration of the communication device 1 is illustrated in FIG. 8. In FIG. 14, parts that are common to the communication device 1 according to the comparative example are indicated by the same reference numerals and symbols as the comparative example, and a description thereof is omitted.

The communication device 1 includes the MUX unit 61, the writer 62, the writing controller 63, the priority queue (first queue) 641, the non-priority queue (second queue) 642, the auxiliary queue 643, the reader 65, and the reading controller 66. The communication device 1 further includes a packet identifying unit 67, a competition detector (detector) 68, a discarding determining unit 69, and a discarding processing unit 89. Although FIG. 14 illustrates the two queues 641 and 642 as queues in which data is written by the writer 62, the communication device 1 may have three or more queues as queues in which data is written by the writer 62.

The auxiliary queue 643 functions as a holder for holding data 74 obtained by copying the read part 72*a* of the non-priority packet 72 that is currently read by the reader 65. The auxiliary queue 643 is composed of a storage unit such as a memory. An input end of the auxiliary queue 643 is connected to a line branched from an output line extending between the non-priority queue 642 and the reader 65. Thus, when the reader 65 reads the non-priority packet 72 from the non-priority queue 642, the data 74 obtained by copying the read data 72*a* of the non-priority packet 72 is stored in the auxiliary queue 643. The copied data 74 stored in the auxiliary queue 643 is read by the reader 65 in accordance with control of the reading controller 66 in the same manner as the packets 71 and 72.

The packet identifying unit 67 inspects the priority packet 71 to be written in the priority queue 641 by the writer 62 and identifies the synchronization message included in the priority packet 71. The identification may be executed by referencing the "messageType" information illustrated in FIG. 3. When identifying the synchronization message, the packet identifying unit 67 outputs an identification signal to the competition detector 68. The reading controller 66 outputs, to the competition detector 68, a notification signal that indicates that the reader 65 currently reads the non-priority packet 72 from the non-priority packet 642.

The competition detector 68 detects the priority packet 71 stored in the priority packet 641 during the reading of the non-priority packet 72 from the non-priority queue 642 by the reader 65. Specifically, the competition detector 68 detects that the priority packet 71 that includes the synchronization message competes with the other non-priority packet 72.

Figure 15:
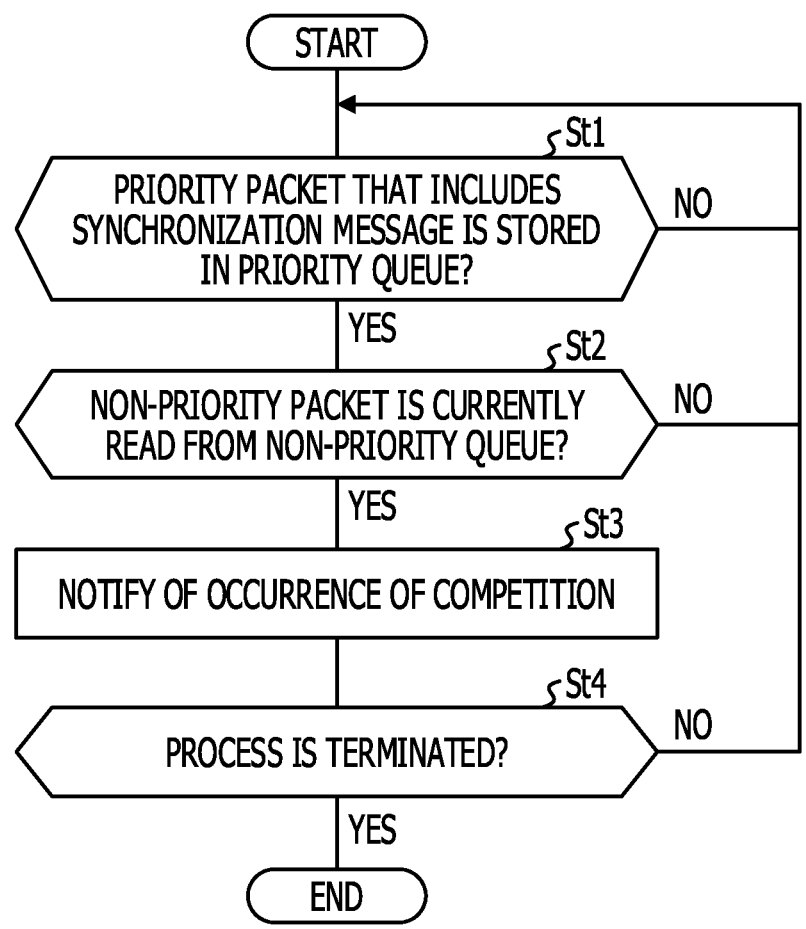
FIG. 15 is a flowchart of operations of a detector.

FIG. 15 is a flowchart of operations of the competition detector 68. The competition detector 68 determines, on the basis of the identification signal received from the packet identifying unit 67, whether or not the priority packet 71 that includes the synchronization message is stored in the priority queue 641 (in step St1). If the competition detector 68 determines that the priority packet 71 is stored (Yes in step St1), the competition detector 68 determines, on the basis of the notification signal received from the reading controller 66, whether or not the reader 65 currently reads the non-priority packet 72 from the non-priority queue 642 (in step St2). If the competition detector 68 determines that the priority packet 71 is not stored (No in step St1), the competition detector 68 executes the process of step St1 again.

If the competition detector 68 determines that the reader 65 currently reads the non-priority packet 72 from the non-priority queue 642 (Yes in step St2), the competition detector 68 outputs a detection signal and thereby notifies the discarding determining unit 69 of the occurrence of the competition of the packets 71 and 72 (in step St3). On the other hand, if the competition detector 68 determines that the reader 65 does not currently read the non-priority packet 72 from the non-priority queue 642 (No in step St2), the competition detector 68 executes the process of step St1 again. If the competition detector 68 continues to execute the process (No in step St4), the competition detector 68 executes the process of step St1 again. In this manner, the competition detector 68 executes the process of detecting the occurrence of the competition.

Figure 16:
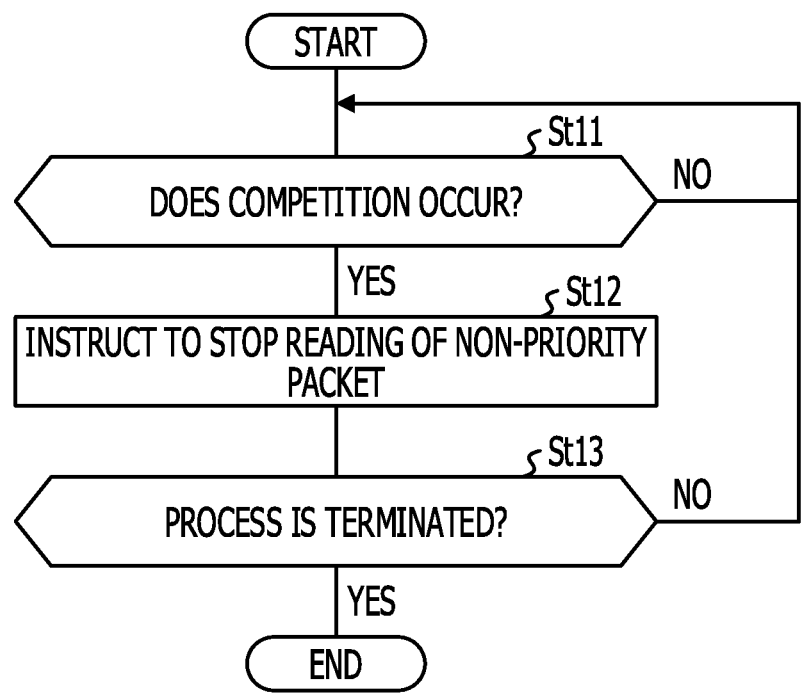
FIG. 16 is a flowchart of operations of a discarding determining unit according to the first embodiment.

The discarding determining unit 69 determines, on the basis of the detection signal received from the competition detector 68, whether or not the read data 72*a* of the non-priority packet 72 is allowed to be discarded or whether or not the reading of the non-priority packet 72 is stopped. FIG. 16 is a flowchart of operations of the discarding determining unit 69 according to the first embodiment.

If the discarding determining unit 69 receives the notification indicating the occurrence of the competition from the competition detector 68 (Yes in step St11), the discarding determining unit 69 outputs, to the reading controller 66, an instruction signal that instructs the reading controller 66 to stop the reading of the non-priority packet 72 (in step St12). On the other hand, if the discarding determining unit 69 does not receive the notification (No in step St11), the discarding determining unit 69 executes the process of step St11 again. If the discarding determining unit 69 continues to execute the process (No in step St13), the discarding determining unit 69 executes the process of step St11 again. In this manner, the discarding determining unit 69 executes the process of determining the stop of the reading.

When receiving the instruction signal from the discarding determining unit 69, the reading controller 66 controls the reader 65 so as to cause the reader 65 to stop the reading and deletes data remaining in the non-priority queue 642 and included in the non-priority packet 72. When stopping the reading of the non-priority packet 72 in accordance with the stop control of the reading controller 66, the reader 65 outputs the read data 72*a* of the non-priority packet 72 to the discarding processing unit 89. The discarding processing unit 89 discards the data 72*a* received from the reader 65. Specifically, when the competition detector 68 detects the priority packet 71 stored in the priority packet 641 during the reading of the non-priority packet 72, the reader 65 causes the internal part of the communication device 1 to discard the currently read non-priority packet 72.

Then, the reader 65 reads the priority packet 71 from the priority packet 641. After completion of the reading of the priority packet 71, the reader 65 reads the copied data 74 held by the auxiliary queue 643. After the reading of the copied data 74, the reader 65 reads an unread part included in the non-priority packet 72 and remaining in the non-priority queue 642. Thus, the copied data 74 and the unread part are combined and read as the aforementioned copied packet 73.

The data 74 may be obtained by copying the non-priority packet 72 stored in the non-priority queue 642. In this case, the input end of the auxiliary queue 643 is connected to a line branched from an output line extending between the writer 62 and the non-priority queue 642. Thus, every time the writer 62 writes the non-priority packet 72 in the non-priority queue 642, the copied data 74 of the non-priority packet 72 is stored in the auxiliary queue 643. Thus, the reader 65 may read the copied data 74 as the copied data 73 without executing the aforementioned combination process. The method for acquiring the copied packet 73 of the non-priority packet 72, therefore, is not limited.

If the competition does not occur or if the instruction signal is not input from the discarding determining unit 69, the reading controller 66 deletes the copied data 74 and thereby avoids unnecessary storage of the copied data 74 in the auxiliary queue 643 every time the reader 65 reads the non-priority packet 72.

According to this configuration, even when the reading of the non-priority packet 72 is in progress, the reader 65 may discard the non-priority packet 72 and read the priority packet 71 stored in the priority queue 641 during the reading of the non-priority packet 72 without causing the priority packet 71 to wait. In addition, since the data 74 obtained by copying at least the part of the currently read non-priority packet 72 is held by the auxiliary queue 643, the reader 65 may read the copied data 74 instead of the discarded non-priority packet 72 after completion of the reading of the priority packet 71.

The communication device 1 according to the present embodiment reduces a variation in delays of the priority packets 71 without a loss of the non-priority packets 72. In addition, the communication device 1 does not divide the packets and does not have to have a complex configuration, unlike Japanese Laid-open Patent Publication No. 2002-16637, and an available part of a communication band is not reduced by divided packets. In addition, the communication device 1 does not impose a limit on the configuration of the network, unlike Japanese Laid-open Patent Publication No. 2003-216595.

According to the communication method according to the present embodiment, the received priority packet 71 and the received non-priority packet 72 are stored in the priority queue 641 and the non-priority queue 642, respectively, and the priority packet 71 is selected on a priority basis over the non-priority packet 72 as a packet to be transmitted. A selected packet to be transmitted is read from the priority queue 641 or the non-priority queue 642, and the read part of the non-priority packet 72 stored in the non-priority queue 642 or the read part of the currently read second packet is copied and held as the copied data 74.

When the priority packet 71 is stored in the priority queue 641 during the reading of the non-priority packet 72 from the non-priority queue 642, the non-priority packet 72 that is currently read is discarded by the internal part of the communication device 1 or by the discarding processing unit 89. Then, the priority packet 71 stored in the priority queue 641 is read, and the held copied data 74 is read after completion of the reading of the priority packet 71.

Since the communication method according to the present embodiment includes the same processes as those executed by the aforementioned communication device 1, the aforementioned effects may be obtained by the communication method according to the present embodiment.

Second Embodiment

As described with reference to FIGS. 6 and 7, in order to ensure the accuracy of the synchronization, a certain number of the packets 71 (or synchronization messages to be transferred by the communication device 1 without waiting) of which the transmission delay times (t−ms) and (t−sm) are in the minimum transmission delay time range are ensured. Thus, the aforementioned priority control for the reading may not be executed on all the packets 71 that include the synchronization messages. From this standpoint, the communication device 1 according to the second embodiment determines, on the basis of a competition occurrence rate of the priority packets 71, whether or not the priority control for the reading is allowed to be executed.

Figure 17:
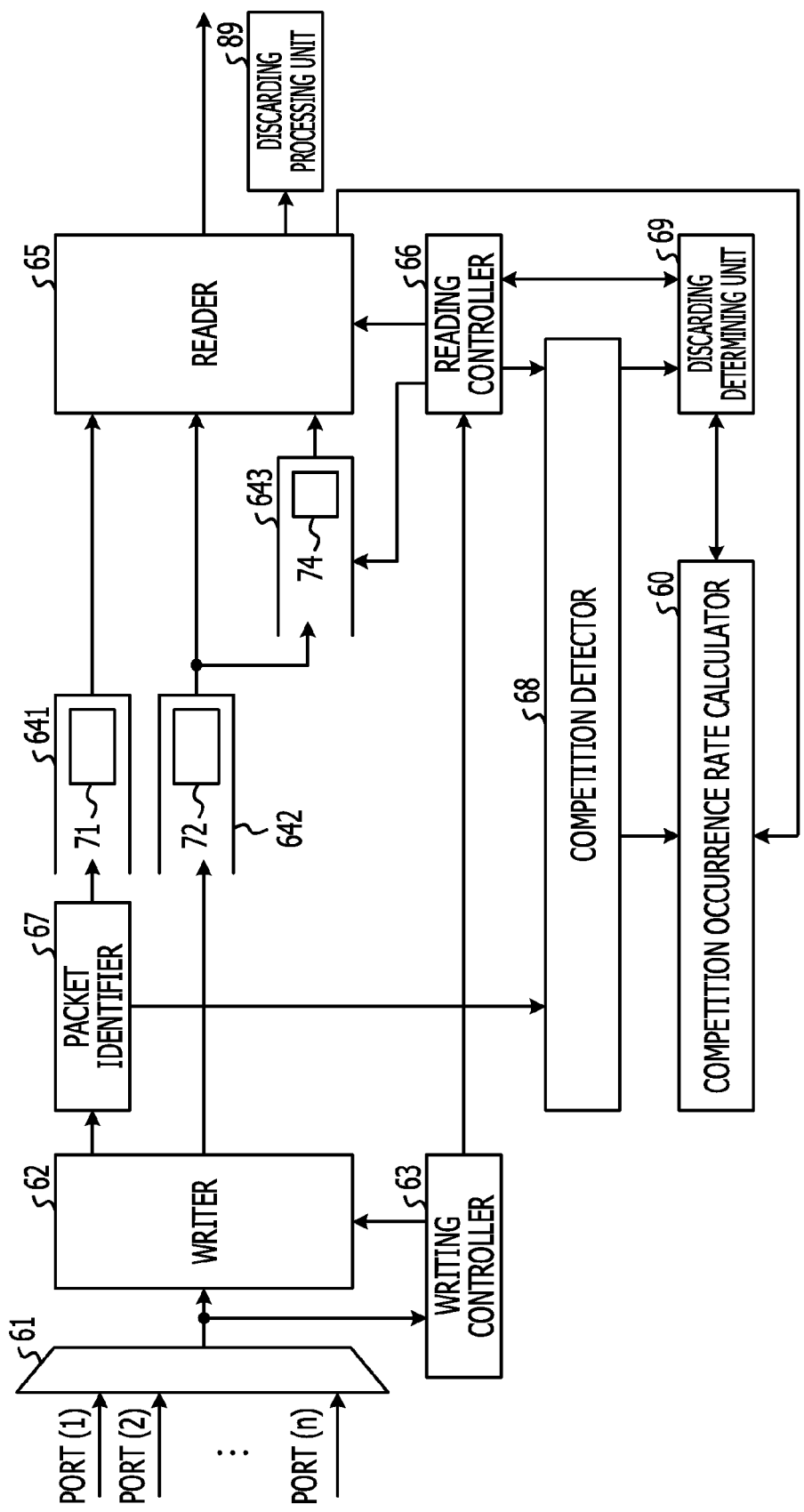
FIG. 17 is a diagram illustrating the configuration of the communication device according to the second embodiment.

FIG. 17 illustrates the configuration of the communication device 1 according to the second embodiment. In FIG. 17, parts that are common to the communication device 1 according to the first embodiment are indicated by the same reference numerals and symbols as the first embodiment, and a description thereof is omitted.

The communication device 1 includes the MUX unit 61, the writer 62, the writing controller 63, the priority queue (first queue) 641, the non-priority queue (second queue) 642, the auxiliary queue 643, the reader 65, and the reading controller 65. The communication device 1 further includes the packet identifying unit 67, the competition detector 68, the discarding determining unit 69, and a competition occurrence rate calculator (first calculator) 60.

When detecting the occurrence of the competition between the priority packet 71 including the synchronization message and the non-priority packet 72, the competition detector 68 outputs a detection signal to the competition occurrence rate calculator 60 and the discarding determining unit 69. When identifying the synchronization message, the packet identifying unit 67 outputs an identification signal to the competition detector 68 and the competition occurrence rate calculator 60.

The competition occurrence rate calculator 60 calculates a competition occurrence rate on the basis of the detection signals received from the competition detector 68 and notification signals received from the reader 65. The competition occurrence rate is obtained by calculating the ratio of the number of the priority packets 71 detected by the competition detector 68 to the number of the priority packets 71 read by the reader 65. Specifically, the competition occurrence rate is obtained by dividing the number of the competing priority packets 71 by the total number of the transmitted (relayed) priority packets 71.

The number of the competing priority packets 71 is calculated on the basis of the detection signals received from the competition detector 68, while the total number of the transmitted priority packets 71 is calculated on the basis of the notification signals received from the reader 65. The total number of the transmitted priority packets 71 may be calculated on the basis of the identification signals received from the packet identifying unit 67 and the like. The competition occurrence rate calculator 60 outputs the calculated competition occurrence rate to the discarding determining unit 69 in response to a request from the discarding determining unit 69.

Figure 18:
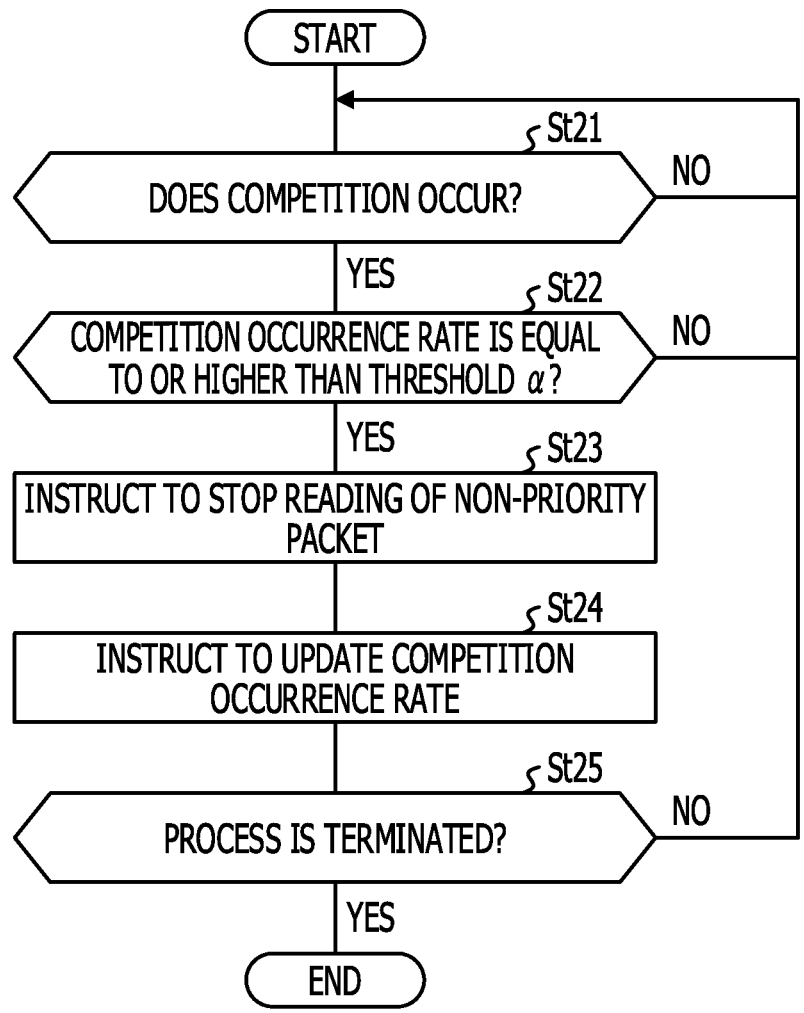
FIG. 18 is a flowchart of operations of the discarding determining unit according to the second embodiment.

The discarding determining unit 69 determines whether to stop reading of the non-priority packet 72 on the basis of the detection signal received from the competition detector 68 and the competition occurrence rate received from the competition occurrence rate calculator 60. FIG. 18 is a flowchart of operations of the discarding determining unit 69 according to the second embodiment.

When receiving the notification of the occurrence of the competition from the competition detector 68 (Yes in step St21), the discarding determining unit 69 determines whether or not the competition occurrence rate is equal to or higher than a threshold α (in step St22). If the competition occurrence rate is equal to or higher than the threshold α (Yes in step St22), the discarding determining unit 69 outputs, to the reading controller 66, an instruction signal that instructs the reading controller 66 to stop the reading of the non-priority packet 72 (in step St23).

Then, the discarding determining unit 69 instructs the competition occurrence rate calculator 60 to update the competition occurrence rate (in step St24). When receiving the instruction of the update, the competition occurrence rate calculator 60 reduces the number of the competing priority packets 71 by 1 and recalculates the competition occurrence rate. Specifically, the priority packet 71 that is transmitted after the stop of the reading of the non-priority packet 72 is treated as a non-competing packet for the calculation of the competition occurrence rate. Thus, the reading of the non-priority packets 72 is inhibited from being excessively stopped.

If the competition occurrence rate is lower than the threshold α (No in step St22), the discarding determining unit 69 executes the process of step St21 again. If the discarding determining unit 69 continues to execute the process (No in step St25), the discarding determining unit 69 executes the process of step St21 again. In this manner, the discarding determining unit 69 executes the process of determining the stop of the reading.

If the competition occurrence rate is equal to or higher than the threshold α, and the competition detector 68 detects the occurrence of the competition, the reader 65 causes the discarding processing unit 89 to discard the currently read non-priority packet 72 and reads the priority packet 71 stored in the priority queue 641. Then, the reader 65 reads the copied data 74 from the auxiliary queue (holder) 643 after completion of the reading of the priority packet 71.

If the competition occurrence rate is lower than the threshold α, and the competition occurs, the communication device 1 according to the present embodiment completes the reading of the non-priority packet 72 without stop of the reading of the non-priority packet 72. Thus, a reduction in the efficiency of use of a communication band of the non-priority packet 72 may be avoided by setting the threshold α to an appropriate value (of, for example, 50%).

As described with reference to FIGS. 6 and 7, the competition occurrence rate is affected by the amount (number of the non-priority packets 72) of the other competing traffic. As described in the present embodiment, if the competition occurrence rate is equal to or higher than the threshold α, and the amount of the competing traffic is large, a certain number of the priority packets 71 of which transmission delay times are in the minimum transmission delay time range may be ensured by executing the reading control. Thus, an influence of a variation, caused by a variation in the amount of the competing traffic, in the delay times of the priority packets 71 is removed, and the accuracy of the frequency synchronization and time synchronization is maintained.

Third Embodiment

Whether or not the reading of the non-priority packet 72 is allowed to be stopped is determined on the basis of the competition occurrence rate in the second embodiment, but may be determined on the basis of the amount of the read data of the non-priority packet 72 and the competition occurrence rate. In the communication device 1 according to the third embodiment, when the competition detector 68 detects the occurrence of the competition, and the amount of the read data among overall data of the currently read non-priority packet 72 is equal to or smaller than a certain value, the reader 65 causes the discarding processing unit 89 to discard the currently read non-priority packet 72. Then, the reader 65 reads the priority packet 71 stored in the priority queue 641 and reads the copied data 74 from the auxiliary queue (holder) 643 after completion of the reading of the priority packet 71.

The communication device 1 according to the third embodiment has the same configuration as illustrated in FIG. 17. With the configuration illustrated in FIG. 17, the reading controller 66 notifies the discarding determining unit 69 of the amount of read data of the non-priority packet 72 in response to a request received from the discarding determining unit 69. The discarding determining unit 69 determines, on the basis of the amount of the read data and the competition occurrence rate, whether or not the reading of the non-priority packet 72 is allowed to be stopped.

Figure 19:
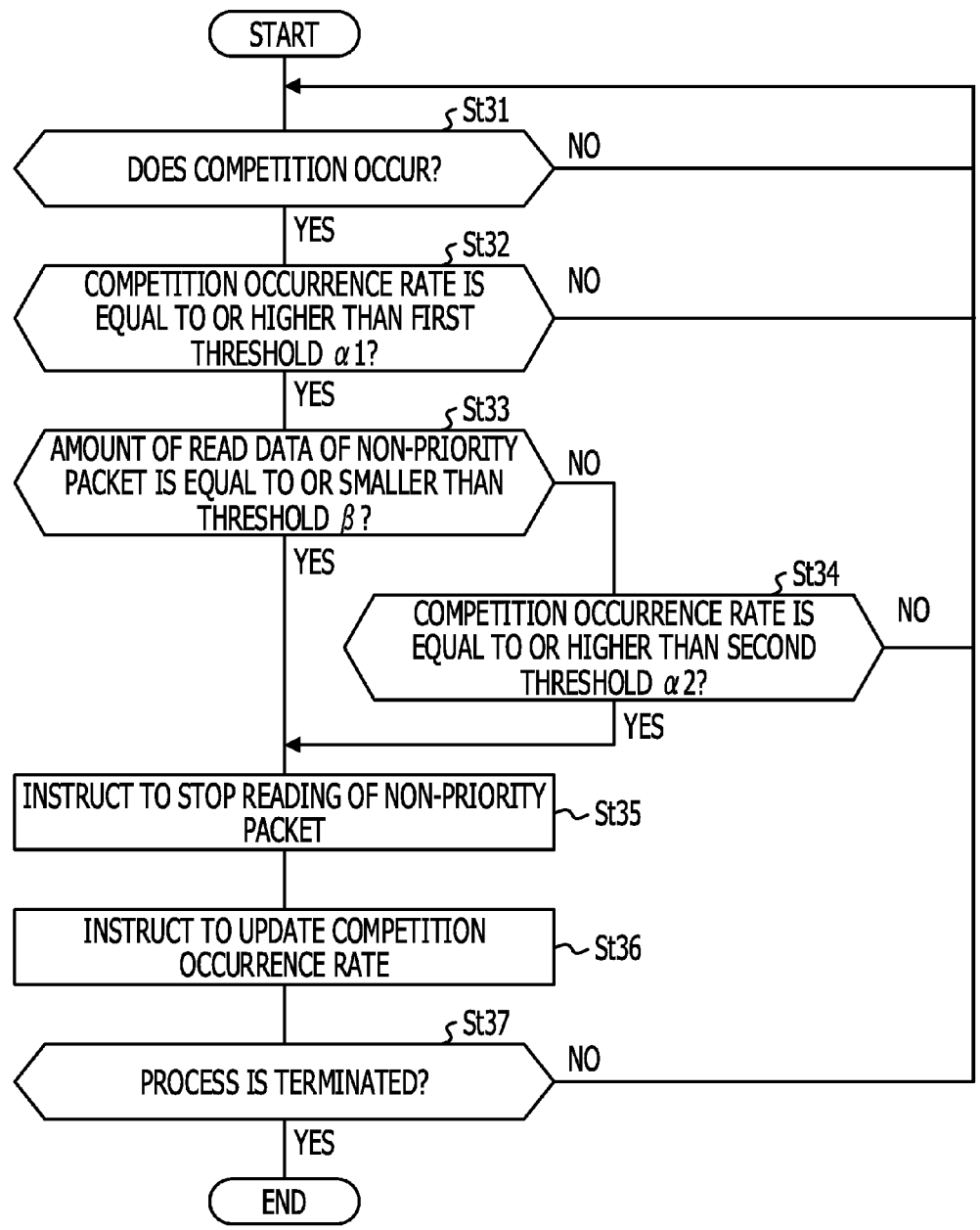
FIG. 19 is a flowchart of operations of the discarding determining unit according to the third embodiment.

FIG. 19 illustrates operations of the discarding determining unit 69 according to the third embodiment. When receiving a notification indicating the occurrence of the competition from the competition detector 68 (Yes in step St31), the discarding determining unit 69 determines whether or not the competition occurrence rate is equal to or higher than a first threshold α1 (of, for example, 40%) (in step St32). On the other hand, if the discarding determining unit 69 does not receive the notification indicating the occurrence of the competition, discarding determining unit 69 executes the process of step St31 again.

If the competition occurrence rate is equal to or higher than the threshold α1 (Yes in step St32), the discarding determining unit 69 determines whether or not the amount of the read data of the non-priority packet 72 is equal to or smaller than a threshold β (of, for example, 1000 bytes) (in step St33). If the competition occurrence rate is lower than the threshold α1 (No in step St32), the discarding determining unit 69 executes the process of step St31 again.

If the amount of the read data of the non-priority packet 72 is equal to or smaller than the threshold β (Yes in step St33), the discarding determining unit 69 outputs, to the reading controller 66, an instruction signal that instructs the reading controller 66 to stop the reading of the non-priority packet 72 (in step St35). Then, the discarding determining unit 69 instructs the competition occurrence rate calculator 60 to update the competition occurrence rate (in step St36) in the same manner as the second embodiment. If the discarding determining unit 69 continues to execute the process (No in step St37), the discarding determining unit 69 executes the process of step St31 again.

If the amount of the read data of the non-priority packet 72 is larger than the threshold β (No in step St33), the discarding determining unit 69 determines whether or not the competition occurrence rate is equal to or higher than a second threshold α2 (of 50%) (in step St34). The second threshold α2 is higher than the first threshold α1. If the competition occurrence rate is equal to or higher than the second threshold α2 (Yes in step St34), the discarding determining unit 69 executes the process of step St35. If the competition occurrence rate is lower than the second threshold α2 (No in step St34), the discarding determining unit 69 executes the process of step St31 again. In this manner, the discarding determining unit 69 executes the process of determining the stop of the reading.

Even if the amount of the read data among the overall data of the non-priority packet 72 is larger than the threshold β, and the occurrence of the competition is detected, the communication device 1 according to the present embodiment does not stop the reading of the non-priority packet 72. For example, if the threshold β is 1000 bytes, the non-priority packet 72 has a length of 1500 bytes, and the competition occurs when data of 1100 bytes is read, the reading is not stopped. Thus, a loss of the data of the non-priority packet 72 is reduced, and a reduction in the efficiency of the use of the communication band of the non-priority packet 72 is avoided.

As illustrated in FIG. 19, if the competition occurrence rate is equal to or higher than the threshold α2, the reading of the non-priority packet 72 is stopped regardless of the amount of the read data of the non-priority packet 72. Thus, an increase in the transmission delay time of the priority packet 71 is avoided, while the increase depends on the data amount of the non-priority packet 72. For example, when a plurality of non-priority packets 72 that have a relatively long length (of, for example, 1500 bytes) are stored in the non-priority queue 642, an increase in the transmission delay time of the priority packet 71 is avoided by avoiding stop of continuous reading. The discarding determining unit 69 may not make the determination on the basis of the amount of the read data and the competition occurrence rate and may make the determination on the basis of only the amount of the read data.

Fourth Embodiment

The thresholds α, α1, and α2 for the competition occurrence rate may be fixed values or may be dynamically variable values. The communication device 1 according to the fourth embodiment determines the thresholds α, α1, and α2 for the competition occurrence rate on the basis of the traffic of the priority packets 71 including the synchronization messages.

Figure 20:
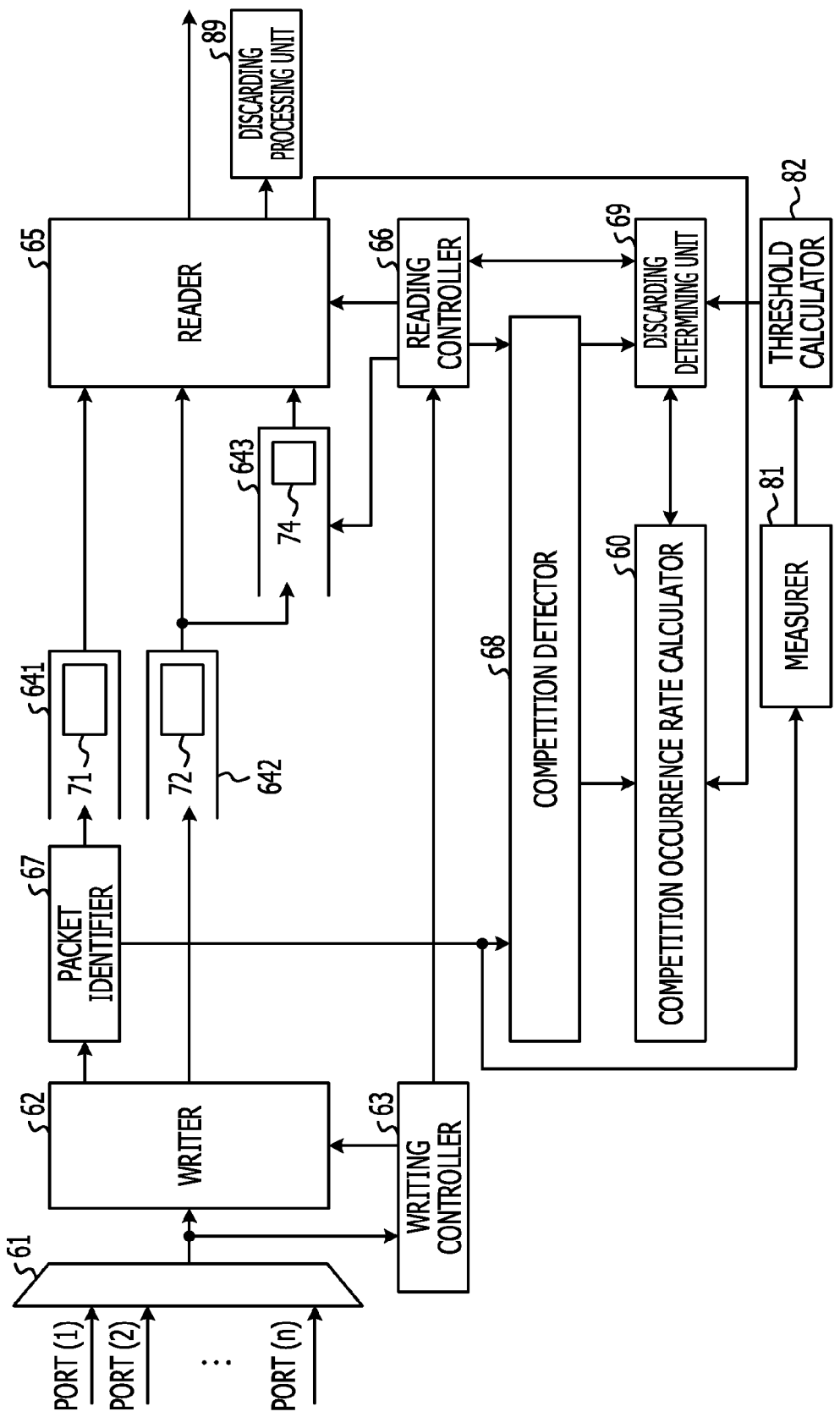
FIG. 20 is a diagram illustrating the configuration of the communication device according to the fourth embodiment.

FIG. 20 illustrates the configuration of the communication device 1 according to the fourth embodiment. In FIG. 20, parts that are common to the communication device 1 according to the first to third embodiments are indicated by the same reference numerals and symbols as the first to third embodiments, and a description thereof is omitted.

The communication device 1 includes the MUX unit 61, the writer 62, the writing controller 63, the priority queue (first queue) 641, the non-priority queue (second queue) 642, the auxiliary queue 643, the reader 65, and the reading controller 66. The communication device 1 further includes the packet identifying unit 67, the competition detector 68, the discarding determining unit 69, the discarding processing unit 89, the competition occurrence rate calculator 60, a measurer 81, and a threshold calculator (second calculator) 82.

The packet identifying unit 67 identifies a synchronization message and outputs an identification signal to the competition detector 68 and the measurer 81. The measurer 81 measures, on the basis of the identification signal, the number (or communication rate) of priority packets 71 received in a unit time and including synchronization messages. The threshold calculator 82 acquires, from the measurer 81, the number of the priority packets 71 received in the unit time and including the synchronization messages, and calculates the thresholds α, α1, and α2 on the basis of the acquired number.

The threshold calculator 82 notifies the discarding determining unit 69 of the calculated thresholds α, α1, and α2. The discarding determining unit 69 executes the aforementioned determination processes (refer to FIGS. 18 and 19) using the notified thresholds α, α1, and α2.

The lower the communication rate of the priority packets 71, the more the threshold calculator 82 reduces the thresholds α, α1, and α2. On the other hand, the higher the communication rate of the priority packets 71, the more the threshold calculator 82 increases the thresholds α, α1, and α2. For example, if the communication rate of the priority packets 71 is 16 pps, the threshold calculator 82 sets the thresholds α, α1, and α2 to 40%. If the communication rate of the priority packets 71 is 128 pps, the threshold calculator 82 sets the thresholds α, α1, and α2 to 50%.

Thus, a certain number of priority packets 71 (synchronization messages) to be transferred without the occurrences of the competition delay times T_cmp may be ensured regardless of the communication rate of the priority packets 71 by determining the thresholds α, α1, and α2 on the basis of the communication rate of the priority packets 71. Specifically, the certain number of priority packets 71 of which the transmission delay times (t−ms) are in the minimum transmission delay time range may be maintained regardless of the communication rate while the accuracy of the synchronization is ensured.

The communication rate of priority packets 71 including the synchronization messages is set in the server device 4 from a network management device or the like. Thus, the threshold calculator 82 may use the set communication rate acquired from the network management device or the like through the controller 10 instead of the actual communication rate measured by the measurer 81. In this case, the threshold calculator 82 may calculate the thresholds α, α1, and α2 every time the communication rate is set. The calculation process is not limited to a method for calculating the thresholds α, α1, and α2 on the basis of a predetermined equation, and may be executed using a method for reading an interested value from a table storing the plurality of thresholds α, α1, and α2 corresponding to communication rates.

Fifth Embodiment

The thresholds α, α1, and α2 for the competition occurrence rate may be determined in response to a request from a client device 5 that is an external device. In this case, the client device 5 receives the priority packet 71 (synchronization message) from the communication device 1 and provides the request on the basis of the measured transmission delay time of the priority packet 71.

Figure 21:
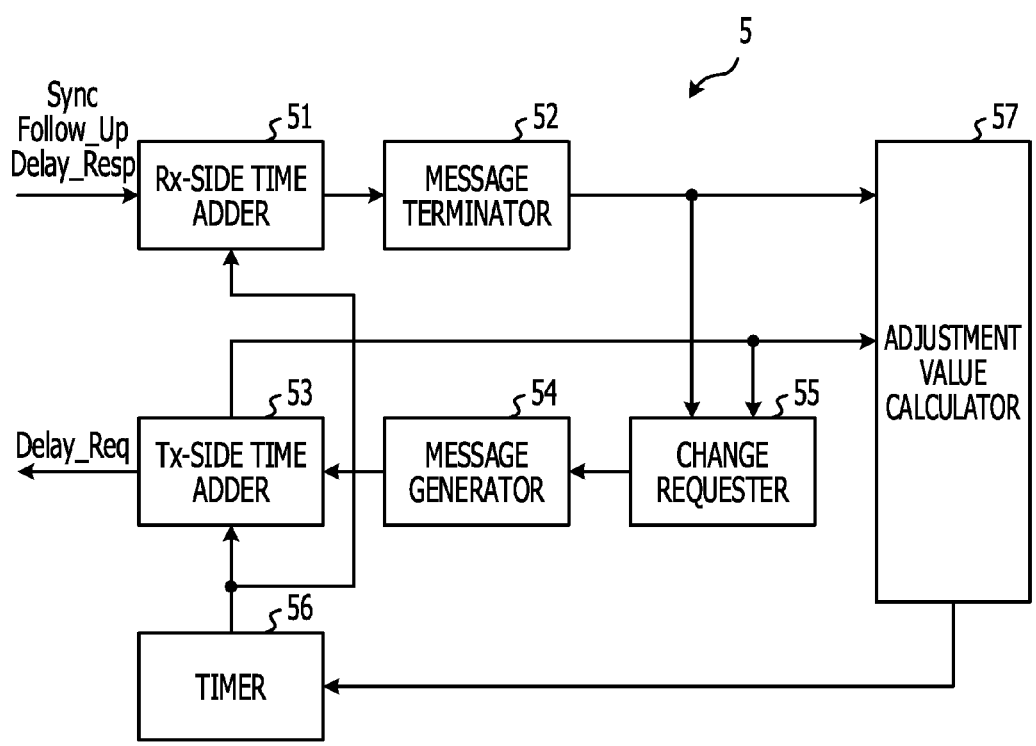
FIG. 21 is a diagram illustrating the configuration of a client device according to the fifth embodiment.

FIG. 21 illustrates the configuration of the client device 5 according to the present embodiment. The client device 5 includes an Rx-side time adder 51, a message terminator 52, a Tx-side time adder 53, a message generator 54, a change requester 55, a timer 56, and an adjustment value calculator 57. The client device 5 executes at least one of the frequency synchronization and the time synchronization between the client device 5 and the server device 3 on the basis of the sequence illustrated in FIG. 2.

The timer 56 outputs, in response to requests provided from the Rx-side time adder 51 and the Tx-side time adder 53, time information indicating the times when the requests are provided. The Rx-side time adder 51 receives the priority packets 71 including the synchronization messages "Sync", "Follow_UP", and "Delay_Resp" through the communication device 1 from the server device 3. When receiving the priority packet 71 including the synchronization message "Sync", the Rx-side time adder 51 adds the time information t2 to the synchronization message "Sync". In this case, the time information t2 is acquired from the timer 56. The Rx-side time adder 51 outputs the synchronization messages "Sync", "Follow_Up", and "Delay_Resp" including the time information t1, t2, and t4 to the message terminator 52.

The message terminator 52 executes a process of terminating the synchronization messages "Sync", "Follow_Up", and "Delay_Resp" received from the Rx-side time adder 51. The message terminator 52 extracts the time information t1, t2, and t4 from the synchronization messages "Sync", "Follow_Up", and "Delay_Resp" and outputs the time information t1, t2, and t4 to the change requester 55 and the adjustment value calculator 57.

The message generator 54 generates the synchronization message "Delay_Req" and outputs the synchronization message "Delay_Req" to the Tx-side time adder 53. The Tx-side time adder 53 adds the time information t3 to the synchronization message "Delay_Req". The time information t3 is acquired from the timer 56. The message generator 54 transmits the synchronization message "Delay_Req" having the time information t3 added thereto to the server device 3 through the communication device 1.

The Tx-side time adder 53 outputs the time information t3 to the change requester 55 and the adjustment value calculator 57. The adjustment value calculator 57 calculates a time value to be offset between the server device 3 and the client device 5 on the basis of the time information t1 to t4 and outputs, to the timer 56, a frequency adjustment value calculated on the basis of the offset value or a time adjustment value calculated on the basis of the offset value. The timer 56 adjusts a frequency or a time in accordance with the frequency adjustment value received from the adjustment value calculator 57 or the time adjustment value received from the adjustment value calculator 57. Thus, the frequency synchronization or the time synchronization between the server device 3 and the client device 5 is established.

The change requester 55 calculates the transmission delay times (t−ms) (=t2−t1) and (t−sm) (=t4−t3) on the basis of the time information t1 to t4 and determines, on the basis of the transmission delay times (t−ms) and (t−sm), the thresholds α, α1, and α2 to be used by the communication device 1. The thresholds α, α1, and α2 are determined for each of the transmission directions. Specifically, the thresholds α, α1, and α2 are determined for the transmission direction from the server device 3 to the client device 5 on the basis of the transmission delay time (t−ms), while the thresholds α, α1, and α2 are determined for the transmission direction from the client device 5 to the server device 3 on the basis of the transmission delay time (t−sm).

Figure 22:
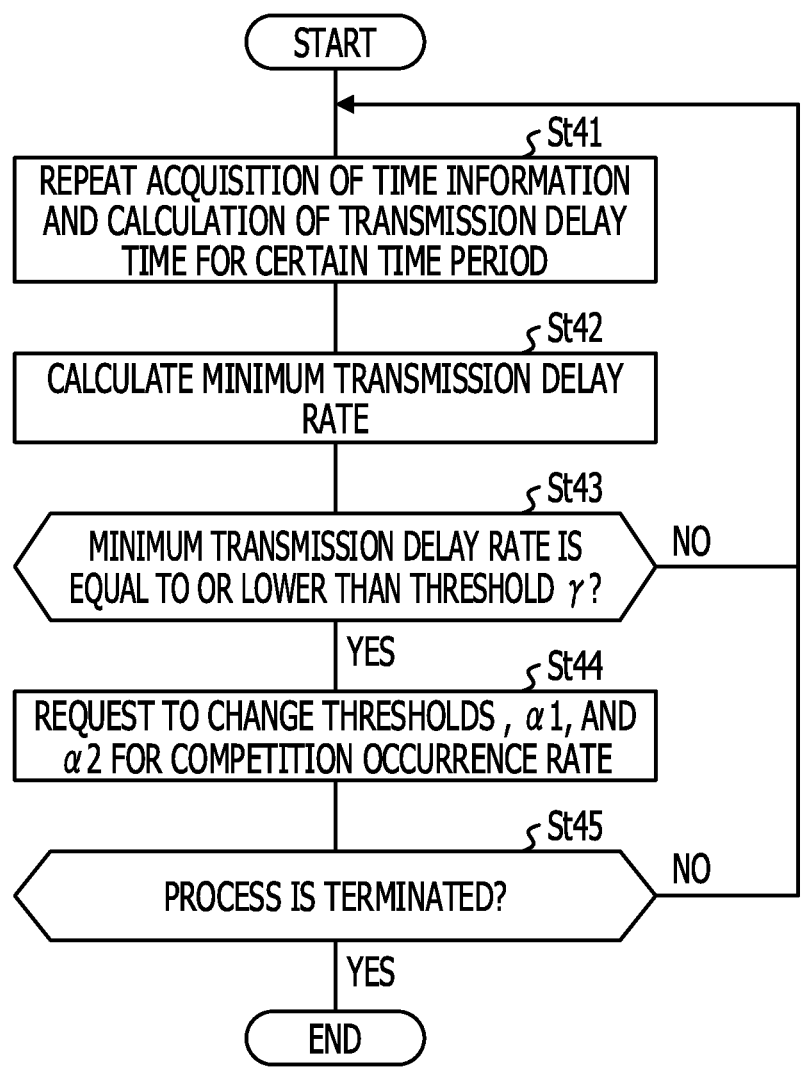
FIG. 22 is a flowchart of an example of operations of a change requester of the client device.

FIG. 22 illustrates an example of operations of the change requester 55 of the client device 5. The operations illustrated in FIG. 22 are executed for each of the transmission directions.

The change requester 55 repeats the acquisition of the time information t1 to t4 from the Rx-side time adder 51 and the message terminator 55 and repeats the calculation of the transmission delay times (t−ms) and (t−sm) on the basis of the time information t1 to t4 for a certain time period (in step St41). Thus, the change requester 55 obtains the transmission delay times (t−ms) and (t−sm) for each of the synchronization messages. Time intervals between repetitive calculations of the transmission delay times (t−ms) and (t−sm) may be determined on the basis of the communication rate of the non-priority packets 72 or the like.

Next, the change requester 55 calculates a minimum transmission delay rate from the calculated transmission delay times (t−ms) and (t−sm). The minimum transmission delay rate is obtained by dividing the number of priority packets 71 of which the transmission delay times are in the minimum transmission delay time range by the total number of received priority packets 71. The number of the priority packets 71 of which the transmission delay times are in the minimum transmission delay time range is extracted from the transmission delay times (t−ms) and (t−sm) (refer to, for example, FIGS. 6 and 7) calculated in the process of step St41.

Then, the change requester 55 determines whether or not the minimum transmission delay rate is equal to or lower than a threshold γ (in step St43). The threshold γ is set on the basis of the communication rate of priority packets 71 including synchronization messages and the number of priority packets 71 that are sufficient to ensure the accuracy of the synchronization and of which the transmission delay times are in the minimum transmission delay time range.

If the minimum transmission delay rate is equal to or lower than the threshold γ (Yes in step St43), the change requester 55 requests the communication device 1 to change the thresholds α, α1, and α2 for the competition occurrence rate (in step St44). For the request, the synchronization message "Delay_Req" that is generated by the message generator 54 may be used.

In this case, the change requester 55 outputs request solicitation information to the message generator 54. The request solicitation information include flags indicating whether or not the thresholds α, α1, and α2 are changed, values indicating the amounts of the changes (or the thresholds α, α1, and α2), and the like. The request solicitation information is generated for each of the transmission directions.

The message generator 54 causes the received request solicitation information to be included in the generated synchronization message "Delay_Req" and transmits the synchronization message "Delay_Req" including the request solicitation information to the communication device 1. In the synchronization message "Delay_Req", a field "reserved" (reservation field for function expansion) illustrated in FIG. 3 may be used as a field for storing the request solicitation information. The request solicitation information is not limited to this format and may be transmitted as a message of another format.

The message generator 54 may transmit the request solicitation information for a certain time period for the case where the minimum transmission delay rate is not improved by one time of transmission of the synchronization message. The message generator 54 may transmit a plurality of the synchronization messages at certain time intervals and thereby continuously change the thresholds α, α1, and α2.

The synchronization message "Delay_Req" (packet 71) that includes the request solicitation information is received by the communication device 1. FIG. 23 illustrates the configuration of the communication device 1 according to the fifth embodiment.

As described above, the communication device 1 includes the controller 10, the switch 11, the plurality of ports (1)12 to (n)12, the Rx-side processing units 131, and the Tx-side processing units 132. The ports (1)12 and (2)12 are connected to the client device 5 and the server device 3, respectively. Thus, the synchronization messages "Sync", "Follow_Up", and "Delay_Resp" are transferred from the port (2)12 to the port (1)12, while the synchronization message "Delay_Req" is transferred from the port (1)12 to the port (2)12.

The synchronization message "Delay Req" that includes the request solicitation information is input to the Tx-side processing unit 132 through the port (1)12. The Tx-side processing unit 132 includes an output port selector 1311 and a message detector 1312.

The output port selector 1311 determines the ports (1)12 to (n)12 that are destinations to which the packets 71 and 72 are transferred. The output port selector 1311 outputs destination port numbers and the packets 71 and 72 to the switch 11. The packet 71 that includes the synchronization "Delay_Req" is transferred to the port (2)12.

The message detector 1312 identifies the synchronization message "Delay_Req", extracts the request solicitation information from the synchronization message "Delay_Req", and outputs the request solicitation information to the controller 10. The controller 10 outputs the request solicitation information to the discarding determining units 69 of the Tx-side processing units 132 corresponding to the transmission directions or ports (1)12 and (2)12. In FIG. 23, the parts that are included in the Tx-side processing units 132 and are other than the discarding determining units 69 are not illustrated. The Tx-side processing units 132, however, have the same configuration as illustrated in FIG. 17.

When receiving the request solicitation information, the discarding determining units 69 each change the thresholds $\alpha$, $\alpha 1$, and $\alpha 2$ in accordance with the amounts, included in the request solicitation information, of the changes in the thresholds $\alpha$, $\alpha 1$, and $\alpha 2$. The determination processes that are executed by the discarding determining units 69 are described above with reference to FIGS. 18 and 19.

Referring back to FIG. 22, if the minimum transmission delay rate is higher than the threshold $\gamma$ (No in step St43), the change requester 22 executes the process of step St41 again without changing the thresholds $\alpha$, $\alpha 1$, and $\alpha 2$ (in step St44). If the change requester 55 continues to execute the process (No in step St45), the change requester 22 executes the process of step St41 again. In this manner, the change requester 55 executes the process of changing the thresholds $\alpha$, $\alpha 1$, and $\alpha 2$ for the competition occurrence rate.

In the communication device 1 according to the present embodiment, the thresholds $\alpha$, $\alpha 1$, and $\alpha 2$ for the competition occurrence rate are determined in response to a request from the client device 5 that receives the priority packet 71 (synchronization message) read and transmitted by the reader 65. The request is based on the transmission delay time, measured by the client device 5, of the priority packet 71.

Even if the number of synchronization messages of which the transmission delay times are in the minimum transmission delay time range is reduced by an increase in the amount of competing traffic, a client device 5 that is a destination of the synchronization messages detects the reduction, and the communication device 1 according to the present embodiment may reduce the thresholds $\alpha$, $\alpha 1$, and $\alpha 2$. Thus, the number of synchronization messages that are to be received by the client device 5 and of which the transmission delay times are in the minimum transmission delay time range may be increased. The client device 5 may increase the competition occurrence rate by causing the increases in the thresholds $\alpha$, $\alpha 1$, and $\alpha 2$ and improve the efficiency of the use of the communication band of the non-priority packets 72.

In the aforementioned embodiments, the reader 65 causes the inside of the communication device 1 or the discarding processing unit 89 to discard the read data 72a of the non-priority packet 72. The reader 65, however, is not limited to this. The reader 65 may cause an external part of the communication device 1 to discard the read data 72a. For example, if the packets 71 and 72 are Ethernet frames (refer to FIG. 10), the reader 65 may add an FCS field with an erroneous value to the read data 72a and cause an external device for receiving the Ethernet frames to discard the read data 72a. In this case, if the FCS field is generated by a media access control (MAC) function provided for the ports 12, the reader 65 provides, to the ports 12, an instruction to add the FCS field with the erroneous value.

This discarding method is effective if the communication device 1 uses cut-through packet transfer. If the packets 71 and 72 are in another format, Header Error Control (HEC) of Generic Framing Procedure (GFP) may be used. In addition, FCSs or cyclic redundancy checks (CRC) for the Point-to-Point Protocol (PPP) may be used.

The communication device 1 according to the embodiments relays the priority packets 71 between the server device 3 and the client device 5 that are synchronized with each other by exchanging the time information included in the priority packets 71. The communication device 1 according to the embodiments, however, is not limited to this. For example, it is preferable that the transmission delay times of a certain number of packets be in the minimum transmission delay time range without being affected by the amount of other traffic in order to ensure the quality of communication between a server device that distributes a video image and a client device that receives the video image. Thus, the communication device 1 may relay a packet between external devices that execute other communication as well as the frequency synchronization and the time synchronization.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A communication device comprising:
a first memory configured to store, among packets, first packets in a first queue;
a second memory configured to store, among the packets, second packets in a second queue;
a processor configured to:
select a first packet to be transmitted by selecting the first packet stored in the first queue in priority to a second packet stored in the second queue,
read the packets from the first or second queue, and
detect the first packet stored in the first queue during a current reading of the second packet from the second queue; and
a third memory configured to hold copied data relating to the second packet,
wherein
the processor is configured to calculate a ratio of a number of first packets detected in the first queue during current readings of second packets from the second queue to a total number of first packets selected in priority to the second packets, and
in response to the detected first packet stored in the first queue during the current reading of the second packet from the second queue and the calculated ratio being equal to or higher than a threshold, the processor is configured to cause an internal or external part of the communication device to discard the currently read second packet, read the first packet stored in the first queue, and read the copied data from the third memory after completion of the reading of the first packet.

2. The communication device according to claim 1, wherein
the third memory is configured to hold the copied data obtained by copying the second packet stored in the second queue or copying a read part of the second packet that is currently read.

3. The communication device according to claim 1, wherein
the processor is configured to acquire a number of the first packets received in a unit time, and calculate the threshold based on the acquired number.

4. The communication device according to claim 1, wherein
the threshold is determined based on a request from an external device that receives the first packet read and transmitted, and
the request is based on a transmission delay time, measured by the external device, of the first packet.

5. The communication device according to claim 1, wherein
in response to the detected first packet stored in the first queue during the current reading of the second packet from the second queue and an amount of read data among overall data of the currently read second packet is equal to or smaller than a certain value,
the processor is configured to cause the internal or external part of the communication device to discard the currently read second packet, read the first packet stored in the first queue, and read the copied data from the third memory after completion of the reading of the first packet.

6. The communication device according to claim 1, wherein
the communication device is configured to relay the first packet between a plurality of external devices that are synchronized with each other by exchanging time information included in the first packet.

7. A communication method comprising:
storing, from among packets, first packets and second packets in first and second queues, respectively;
selecting a packet to be transmitted by selecting the first packet stored in the first queue in priority to a second packet stored in the second queue;
reading the packets from the first or second queue;
detecting the first packet stored in the first queue during a current reading of the second packet from the second queue;
holding copied data relating to the second packet; and
calculate a ratio of a number of first packets detected in the first queue during current readings of second packets from the second queue to a total number of first packets selected in priority to the second packets,
in response to the detecting the first packet stored in the first queue during the current reading of the second packet from the second queue and the calculated ratio being equal to or higher than a threshold, causing, with a processor, an internal or external part of a communication device to discard the currently read second packet, reading the first packet stored in the first queue, and reading the held copied data after completion of the reading of the first packet.

8. The communication method according to claim 7, wherein
the holding includes holding the copied data obtained by copying the second packet stored in the second queue or copying a read part of the second packet that is currently read.

9. The communication method according to claim 7, further comprising:
acquiring a number of the first packets received in a unit time; and calculating the threshold based on the acquired number.

10. The communication method according to claim 7,
wherein the threshold is determined based on of a request from an external device that receives the first packet read and transmitted, and
wherein the request is based on a transmission delay time, measured by the external device, of the first packet.

11. The communication method according to claim 7, further comprising:
in response to the detected first packet stored in the first queue during the current reading of the second packet from the second queue and an amount of read data among overall data of the currently read second packet is equal to or smaller than a certain value, causing the internal or external part of the communication device to discard the currently read second packet, reading the first packet stored in the first queue, and reading the copied data from the third memory after completion of the reading of the first packet.

12. The communication method according to claim 7, further comprising:
relaying the first packet between a plurality of external devices that are synchronized with each other by exchanging time information included in the first packet.

13. A communication system comprising:
a plurality of external devices; and
a communication device that relays a packets between the plurality of external devices,
wherein the communication device is configured to:
store, from among the packets, first packets and second packets in first and second queues, respectively,
select a first packet to be transmitted by selecting the first packet stored in priority to a second packet stored in the second queue,
read the packets from the first or second queue,
detect the first packet stored in the first queue during a current reading of the second packet from the second queue,
hold copied data relating to the second packet, and
calculate a ratio of a number of first packets detected in the first queue during current readings of second packets from the second queue to a total number of first packets selected in priority to the second packets,
in response to the detected first packet stored in the first queue during the current reading of the second packet from the second queue and the calculated ratio being equal to or higher than a threshold, cause an internal or external part of the communication device to discard the currently read second packet, read the first packet stored in the first queue, and read the held copied data after completion of the reading of the first packet.

14. The communication system according to claim 13, wherein
the communication device is configured to hold the copied data obtained by copying the second packet stored in the second queue or copying a read part of the second packet that is currently read.

15. The communication system according to claim 13,
wherein a number of the first packets received in a unit time is acquired, and the threshold is calculated on the basis of the acquired number.

16. The communication system according to claim 13,
wherein the threshold is determined on the basis of a request from at least one external device that receives the first packet read and transmitted, and
wherein the request is based on a transmission delay time, measured by the external device, of the first packet.

17. The communication system according to claim 13, wherein
in response to the detected first packet stored in the first queue during the current reading of the second packet from the second queue and an amount of read data among overall data of the currently read second packet is equal to or smaller than a certain value, the communication device is configured to cause the internal or external part of the communication device to discard the currently read second packet, read the first packet stored in the first queue, and read the copied data from the third memory after completion of the reading of the first packet.

* * * * *